United States Patent [19]

Hosokawa

[11] Patent Number: 5,982,942
[45] Date of Patent: Nov. 9, 1999

[54] IMAGE-QUALITY MEASURING METHOD

[75] Inventor: Kyousuke Hosokawa, Yokohama, Japan

[73] Assignee: Sharp Kabushiki Kaisha, Osaka, Japan

[21] Appl. No.: 08/872,609

[22] Filed: Jun. 10, 1997

[30] Foreign Application Priority Data

Jun. 26, 1996 [JP] Japan ................................. 8-165851

[51] Int. Cl.$^6$ .............................. G06K 9/46; G06K 9/52; G06K 9/56; G06T 5/00; G06T 5/40
[52] U.S. Cl. ...................... 382/266; 382/168; 382/199; 382/205
[58] Field of Search ..................................... 382/209, 217, 382/218, 278, 266, 298, 287, 269, 264, 205, 168, 254, 260, 257, 258, 299, 199; 395/102; 358/451, 447

[56] References Cited

U.S. PATENT DOCUMENTS

| | | | |
|---|---|---|---|
| 4,847,641 | 7/1989 | Tung ........................................ | 347/131 |
| 5,005,139 | 4/1991 | Tung ........................................ | 382/254 |
| 5,134,495 | 7/1992 | Frazier et al. ........................... | 358/298 |
| 5,193,008 | 3/1993 | Frazier et al. ........................... | 358/298 |
| 5,212,741 | 5/1993 | Barski et al. ............................ | 382/51 |
| 5,533,149 | 7/1996 | Kaplan et al. .......................... | 382/260 |
| 5,537,483 | 7/1996 | Stapleton et al. ....................... | 382/168 |
| 5,644,366 | 7/1997 | Ushida et al. .......................... | 382/266 |
| 5,657,430 | 8/1997 | Smith et al. ............................. | 395/102 |

*Primary Examiner*—Scott Rogers
*Assistant Examiner*—King Yau Poon
*Attorney, Agent, or Firm*—Dike, Bronstein, Roberts & Cushman, LLP; David G. Conlin

[57] ABSTRACT

Upon measuring the image-quality of an original document, the original document is photographed, and the resulting image is displayed on cells within a window so that image-quality data, such as the degree of edge-irregularity a, is obtained. A regression line is found based upon the correlation between the cell size and the image-quality data. By setting the image-quality data resulting from a specific sell size as a reference value, respective pieces of image-quality data are converted and corrected based upon the regression line using the reference value as a target. Thus, it becomes possible to compare pieces of image quality data in an equivalent manner even if they were obtained from measurements using different magnifications.

13 Claims, 22 Drawing Sheets

IMAGE-QUALITY MEASURING METHOD

FIELD OF THE INVENTION

The present invention relates to an image-quality measuring method for carrying out image-quality evaluation on printed matters such as copied documents obtained from apparatuses such as copying machines, printers and facsimile scanners, and more particularly concerns a method for carrying out image-quality measurements on edge portions of lines and characters of binary images.

BACKGROUND OF THE INVENTION

Printed matters such as copied documents are obtained by various apparatuses, such as copying machines, printers and facsimile scanners. In order to evaluate the image-quality of these printed matters, it is necessary to measure various image-quality data related to image quality. Image-quality measuring devices have been used in order to measure these image-quality data.

When the above-mentioned measurements are carried out by using an image-quality measuring device, a printed matter is placed on a document platen as an original document, and illuminated by a illuminating device. The image of the original document is enlarged by using a microscope or other devices. The subsequent enlarged image is photographed by a CCD (Charge Coupled Device) camera or other devices so that an image signal is obtained.

A window, which serves as a display region having specific cells (pixels), is provided on a display screen such as a display of a computer, and an image derived from the image signal is displayed within the window. In accordance with the image signal, calculations are carried out on various evaluation items regarding image quality by using a computer or other devices so that various measured values are obtained as image-quality data. The image quality of the printed matter is evaluated by using these measured values.

The evaluation items include, for example, the degree of edge-irregularity of the line image, the degree of edge-blurredness of the line image, line-widths of the line image, etc.

However, upon carrying out the above-mentioned measurements, differences in magnification inevitably result in differences in resolution. For this reason, even in the case when the same image is measured, differences in magnification cause dispersion (irregularity) in the measured values. Consequently, in the case of measurements using different magnifications, such as in the case of different magnifications resulting from the application of different measuring devices and in the case in which different magnifications are used even in the same measuring device, it is not possible to simply compare the resulting measured values with each other. In other words, the resulting problem is that the measured values are not compared in an equivalent manner.

Moreover, in general, the image-quality data vary depending on the measuring magnification; and how they vary is affected by the image quality of the document, and it tends to differ. For this reason, even if a constant correction value is applied to the measured values regardless of the magnification in order to suppress the variation, it is not possible to obtain an appropriate correction in a specific magnification although it is possible to obtain an appropriate correction in other magnifications. Consequently, dispersion still occurs in the measurement precision.

SUMMARY OF THE INVENTION

The objective of the present invention is to provide an image-quality measuring method that makes it possible to compare pieces of image-quality data with each other in an equivalent manner even if they were obtained by measurements using different magnifications.

In order to achieve the above-mentioned objective, the image-quality measuring method of the present invention, which is an image-quality measuring method for measuring image-quality data used for evaluating image quality of an original document, is characterized by the steps of: preparing a window having cells that serve as pixels whose size is defined by a cell size; photographing the original document and displaying the resulting image on the cells; obtaining measured values consisting of the cell size x and the image-quality data y by finding the image-quality data; finding a regression line based upon the correlation between the cell size x and the image-quality data y, setting image-quality data related to a specific cell size as a reference value; and correcting the image-quality data by using a conversion equation based upon the regression line.

Therefore, it becomes possible to compare pieces of image-quality data with each other in an equivalent manner even if they were obtained by measurements using different magnifications.

Moreover, it is possible to improve the measurement precision even in the case of measurements using a low magnification.

Furthermore, since the measured values are less affected by image quality, the measurement precision can be improved with respect to various images with a wide range of image qualities.

For a fuller understanding of the nature and advantages of the invention, reference should be made to the ensuing detailed description taken in conjunction with the accompanying drawings.

DESCRIPTION OF THE EMBODIMENT

Referring to FIGS. 1 through 9, the following description will discuss one embodiment of the present invention.

Figure 2:
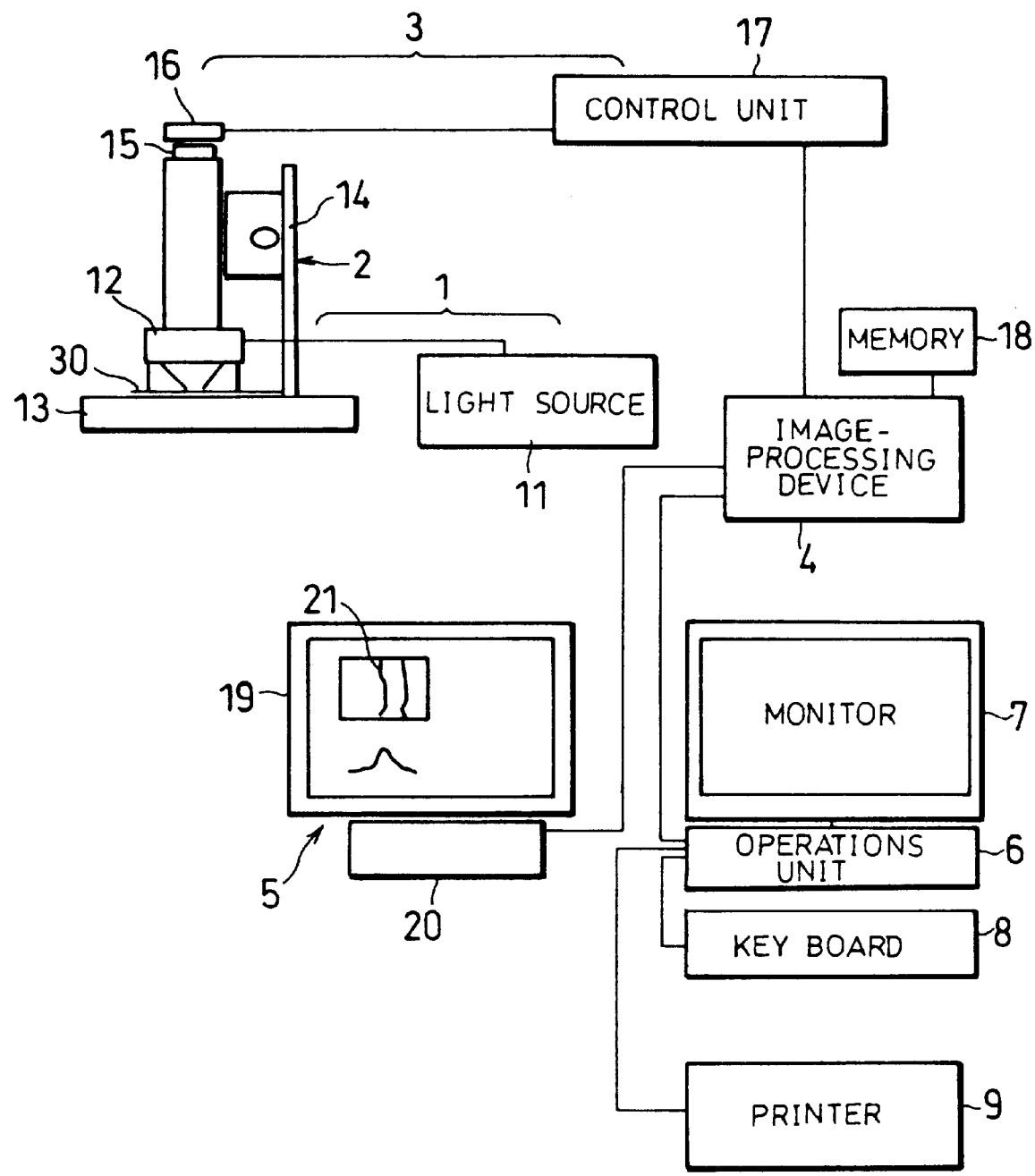
FIG. 2 is a block diagram showing one structural example of an image-quality measuring device.

As illustrated in FIG. 2, an image-quality measuring device used in the present image-quality measuring method is constituted by a light-source device 1, a microscope 2, a CCD (Charge Coupled Device) camera 3 (photographing means), an image-processing device 4 and an image display device 5 that are connected in this order. An operations unit 6 is also connected to the image-processing device 4. A monitor 7, a key board 8 and a printer 9 are connected to the operations unit 6.

The light-source device 1 is provided with a light source 11 and an illuminating ring 12 (illuminating means). The microscope 2 is provided with a document platen 13, a stand 14 and an ocular section 15. An original document 30, such as a printed paper, is placed on the document platen 13. The illuminating ring 12 illuminates the original document 30.

The CCD camera 3 is provided with a head 16 that serves as a photographing lens section and a control unit 17 that controls the head 16. The head 16 is attached to the ocular section 15 of the microscope 2. The control unit 17 is connected to the image-processing device 4.

The image-processing device 4 is constituted by a computer to which is connected a memory 18 for storing various data related to images.

The image display device 5 is provided with a display 19 and a display control section 20. The display 19 has cells (pixels) which will be described later. The display 19, which functions as an image monitor by using the cells, displays a window 21 to be described later, various pieces of image information related to image processing, and other items. The display control section 20, which is provided with an amplifier, applies display-use voltages to the cells on the display 19 while controlling the voltages, in accordance with image signals from the image-processing device 4.

The operations unit 6, which carries out calculations on image-quality data, is constituted by a computer. The monitor 7 displays information that has been entered by the user through a key board 8 upon carrying out calculations, the results of the calculations on the image-quality data, and other information. The printer 9 prints the results of the calculations.

The following description will briefly discuss a sequence of the above-mentioned measurements that are carried out by the present image-quality measuring device.

First, printed paper is placed on the document platen 13 as an original document, and illuminated by the illuminating ring 12. The image of the printed paper is enlarged to a predetermined magnification by using the microscope 2. The enlarged image is photographed by the CCD camera 3 so that an image signal is obtained.

The image-processing device 4 applies processes to the image signal so as to obtain an appropriate image to be displayed, and sends the resulting image signal to the image display device 5. In accordance with the image signal, the image display device 5, while controlling display-use voltages, applies the voltages to the cells on the display 19 by the use of the amplifier of the display control section 20.

Here, a window 21, which serves as a sampling window that is a display region having specific cells, is displayed on the display screen of the display 19. An image derived from the image signal is displayed in the window 21 in accordance with the display-use voltages. Based upon various pieces of information (to be described later) that are obtained from the image, the operations unit 6 carries out calculations on various evaluation items regarding the image quality, and provides various measured values as image-quality data. The user is allowed to evaluate the image quality of the printed paper by using these measured values.

In the present embodiment, a line-shaped image (line image) is used as an object for image-quality evaluation. In this case, the evaluation items are, for example, the degree of edge-irregularity of the line image, the degree of edge-blurredness of the line image, line-widths of the line image, etc. In the present embodiment, the degree of edge irregularity of the line image is measured as the image-quality data.

Next, an explanation will be given of a sequence of the image-quality measurements in detail.

Preparation for Window

Figure 3:
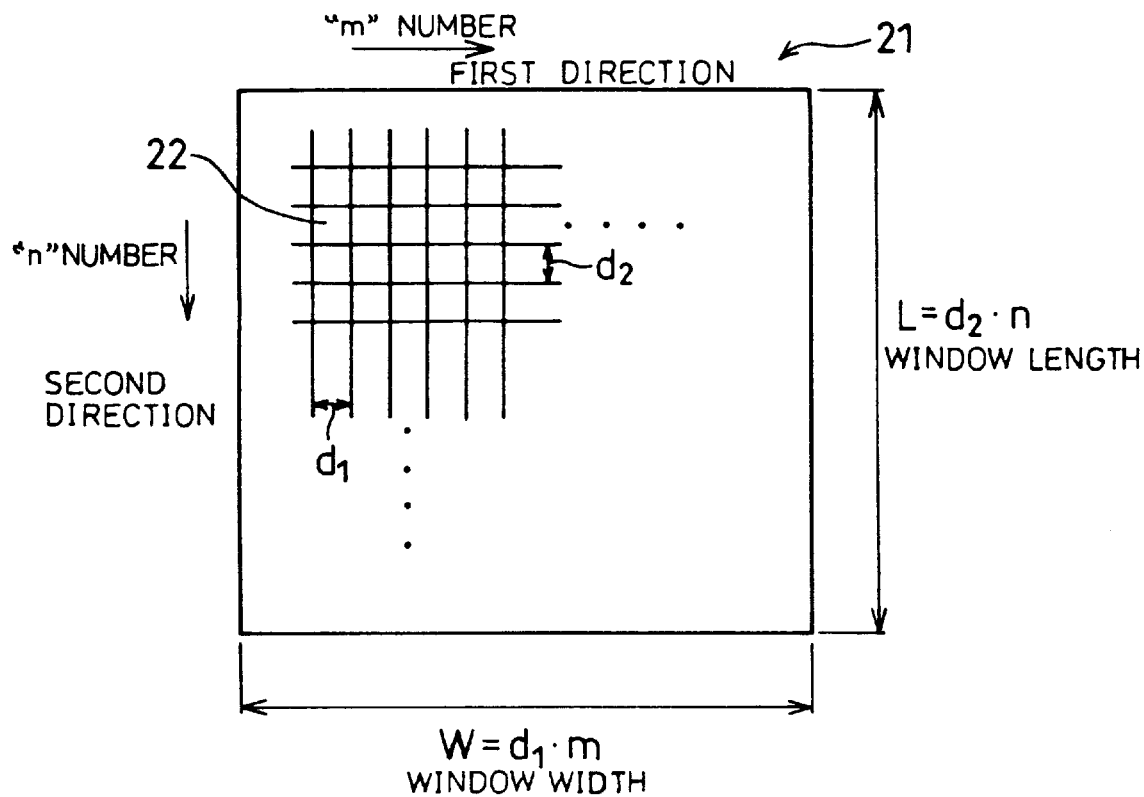
FIG. 3 is an explanatory drawing that shows a structure of cells in a window.

The window 21 is constructed as follows:

As illustrated in FIG. 3, the width direction (the first direction) and the length direction (the second direction) are defined in the window. Further, a group of cells, aligned in the first direction, constitutes each row, and a group of cells, aligned in the second direction, constitutes each column. In the window, "m" number of cells in the first direction and "n" number of cells in the second direction are arranged in a matrix format; that is, the total "mn" number of cells 22 (pixels) are arranged. Each of the cells has a plurality of gray scales. Cell numbers from 1 to m are allocated to the respective cells 22 one by one in the first direction from the end. When the magnification of the microscope 2 is determined, the length on the original document that is represented by one cell 22 (cell size) is also determined. In other words, the size of an image (magnification) is defined by the cell size. For this reason, the magnification can be represented by the cell size.

Assuming that the length of each cell 22 in the first direction (cell size) is $d_1$ and the length thereof in the second direction is $d_2$, the window width W corresponding to the width of the original document is represented by $W=d_1m$ and the window length L corresponding to the length of the original document is represented by $L=d_2n$. The higher the magnification (resolution), the smaller the cell size becomes in inverse proportion thereto; thus, the image is displayed more accurately within the window having a predetermined size. Consequently, the image can be analyzed in more detail. In the following description, upon carrying out the measurements on a specific original document, the cell size is used to represent the magnification, unless otherwise specified. Here, in the case of the cell size used to represent the magnification, the cell size is represented by x.

Display of Line Image

Figure 4:
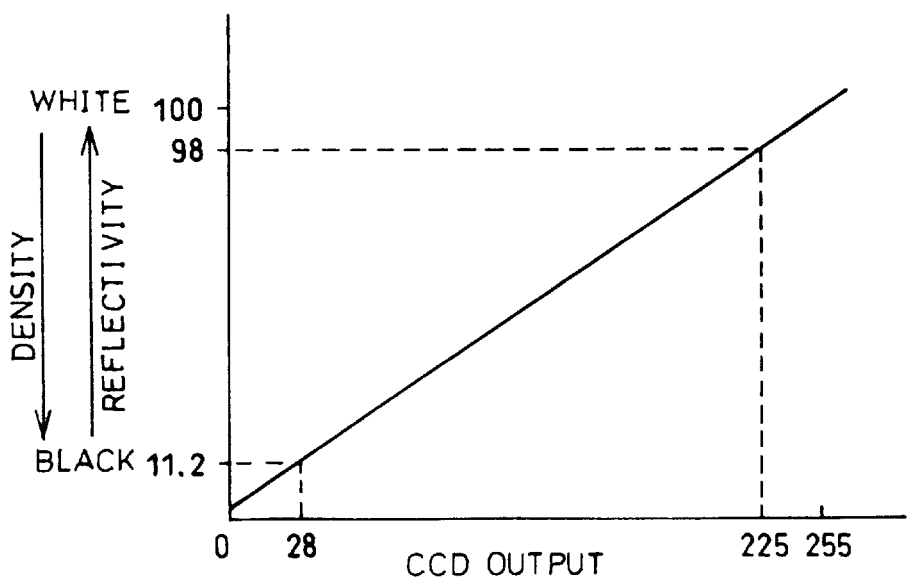
FIG. 4 is a graph that shows the relationship between the CCD output of a camera head and the density of an image.

Referring to a flow chart in FIG. 1, an explanation will be given as follows:

An original document 30 (see FIG. 2), such as printed paper having a line image, is prepared. The original document is enlarged by the microscope 2 while illuminating the original document by the illuminating ring 12. The resulting enlarged image is photographed by the CCD camera 3, and sampled (S1). Thus, an image signal having predetermined gray scales (for example, 256 gray scales) is obtained. In accordance with the image signal, display-use voltages are applied to the cells 22 by the use of the amplifier of the display control section 20. Consequently, the respective cells are allowed to display an image corresponding to the original document with predetermined densities derived from the voltages. In this case, as illustrated in FIG. 4, the gray scales of the image signal and the densities of the cells 22 are maintained to have a constant correlation by adjusting the quantity of light illuminating the original document and the display-use voltages (S2). Here, in the drawing, the axis of abscissa represents the output of the CCD and the axis of ordinate represents the reflectivity thereof. In this manner, the image of the original document is displayed on the window 21.

Adjustment of Positional Relationship Between Line Image and Window

Here, in fact, a line image has a width. The positional relationship between the line image and the window is adjusted so that the above-mentioned first direction and second direction are respectively coincident with the width direction and length direction of the line image. Additionally, for efficient measurements, it is preferable to make the extending direction of the line image coincide with the cell direction when the printed paper is placed on the document platen. Alternatively, after converting the image of the original document into an image signal, the image may be rotated within the window so that the above-mentioned two directions are respectively coincident with the width direction and length direction of the line image.

Identification of Line Image

Figure 5:
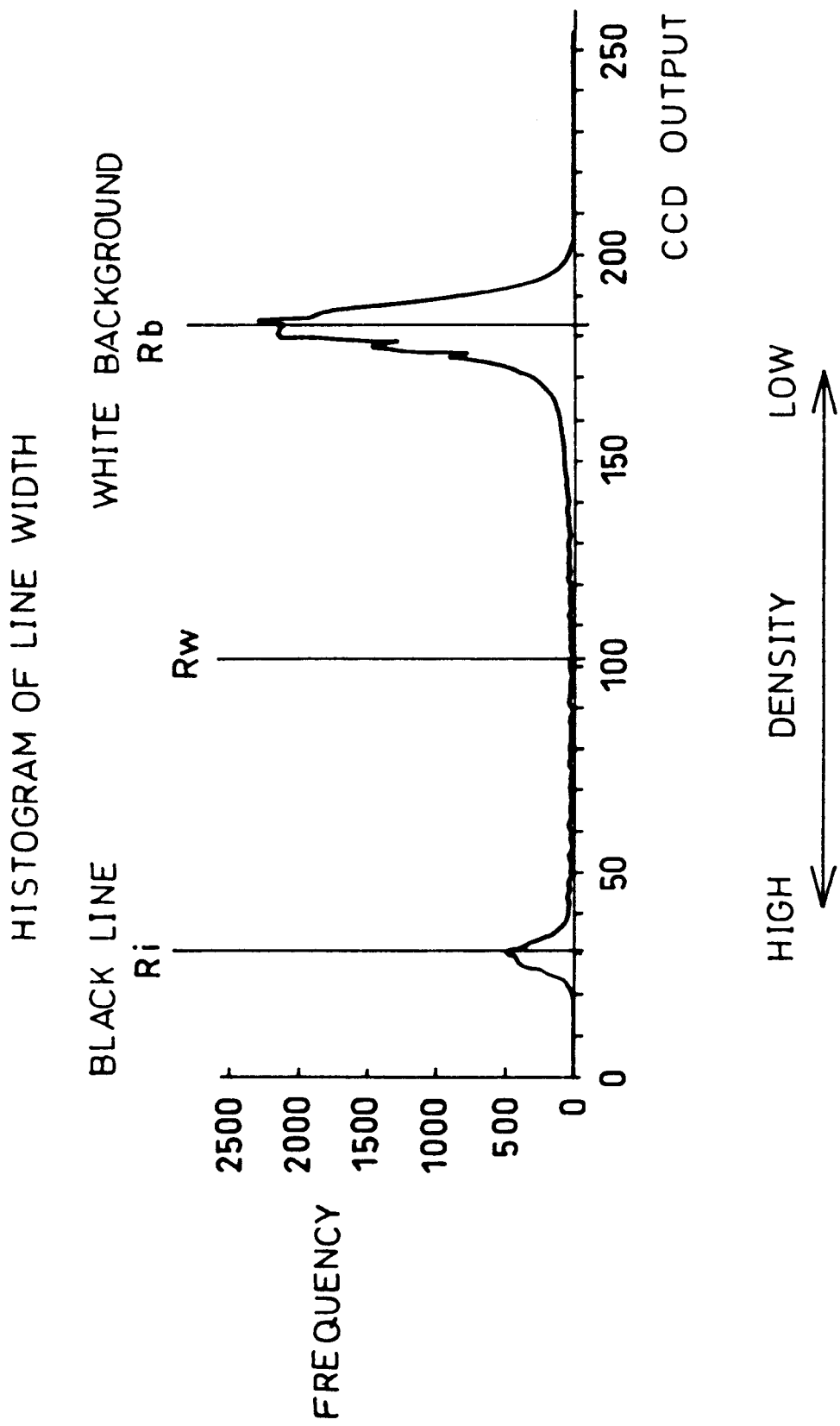
FIG. 5 is an explanatory drawing that shows the relationship between the gray scales and frequency in the window.

In the image-processing device 4, the width of the line image is determined as follows:

Densities of the image in the respective cells are detected from the cells 22 within the window. Then, as illustrated in FIG. 5, a histogram is made for respective densities, and the frequency distribution of each density is found (S3). Further, the first density Ri (the most frequent value of the image), which is a maximum in frequency on the high-density side, is found (S4). Moreover, the second density Rb (the most frequent value of the background), which is a maximum in frequency on the low-density side, is found (S5).

Next, assuming that:

$$Rw = tRi + (1-t)Rb \qquad (1)$$

Figure 6:
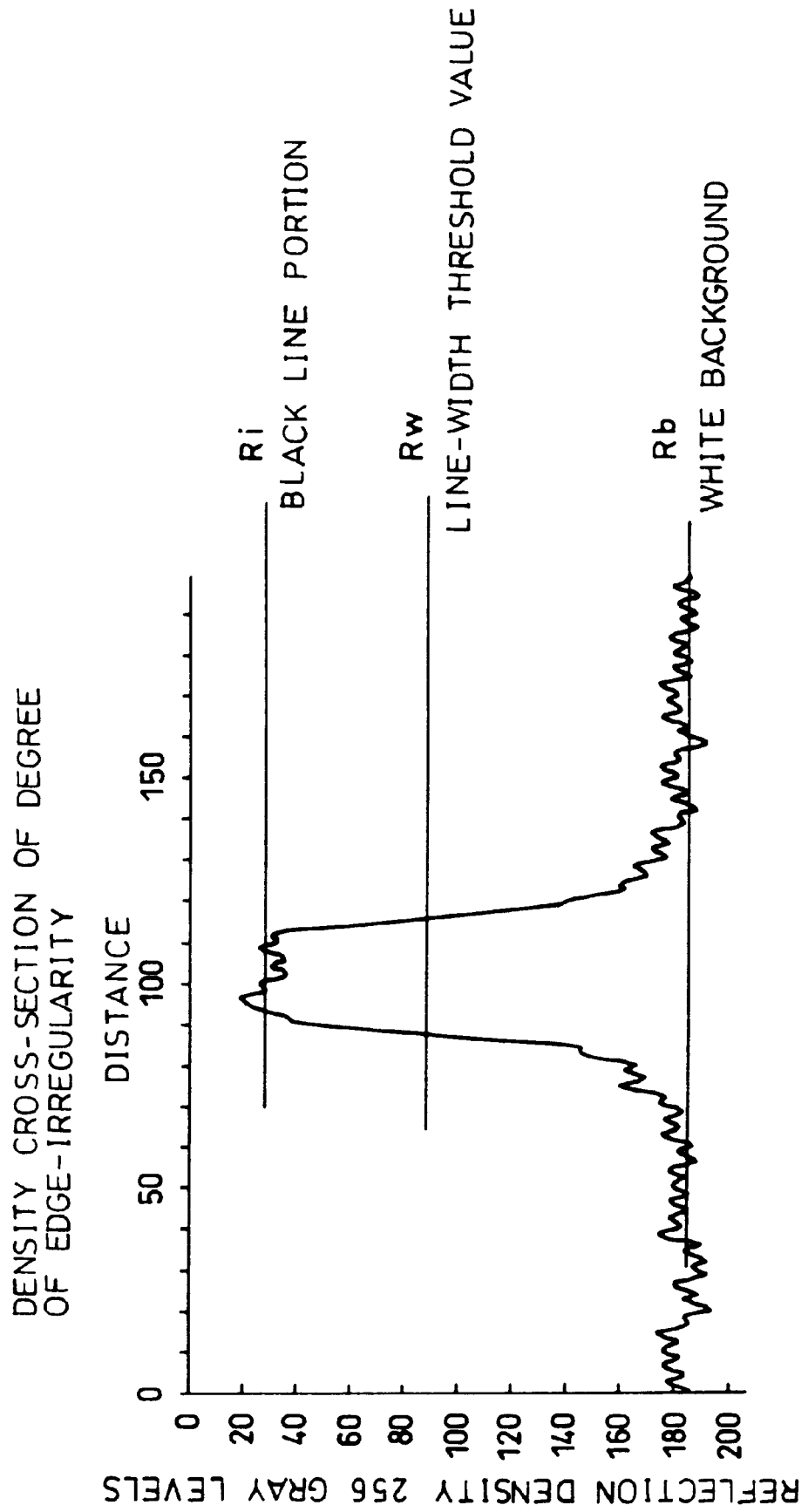
FIG. 6 is an explanatory drawing that shows the relationship between the position in a first direction along horizontal scanning lines and the gray scales in the window.

(where $0.45 \leq t \leq 0.70$), for example, $Rw=0.6Ri+0.4Rb$, the threshold-value density Rw between Ri and Rb is found. In this case, FIG. 6 shows the relationship between the gray scales and distances from one end of the window frames to the respective cells, that is, the density cross-section representing the degree of edge-irregularity. In the drawing, the distance is represented by the standard deviation using the unit $\mu$m. Thus, those cells having densities of not less than Rw are considered to represent the line image. In contrast, those cells having densities of less than Rw are considered to represent the background without the line image. In this manner, the densities of the image are binary coded. Further, among the cells representing the line image, those located at positions adjacent to the cells representing the background are defined as border lines. Consequently, as illustrated in FIG. 7, the border lines 40 and 41 on both sides of the line image 31 are determined.

Determining the Degree of Edge-Irregularity

Figure 7:
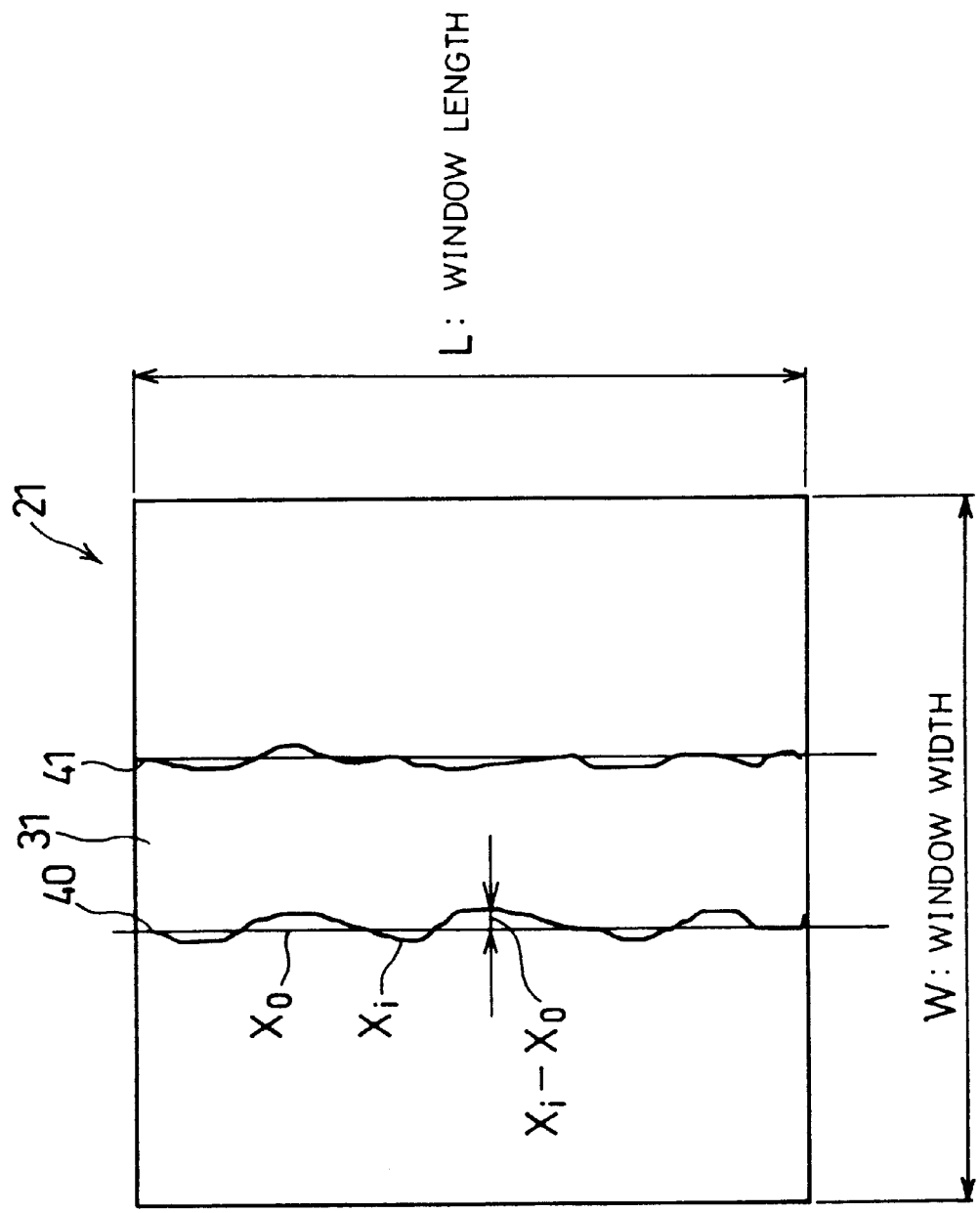
FIG. 7 is an explanatory drawing that shows the degree of edge-irregularity in the window.

Even if it is drawn as a straight line, a line image has irregularities in the width direction (the first direction) since it, in fact, winds in the width direction of the line. The degree of edge-irregularity at this time is found by the operations unit 6 in the following manner (S6):

As illustrated in FIG. 7, the number of a specific cell that centered on the irregularity and that has an optimal straight line passed thereon is designated as $X_o$. $X_o$ represents the optimal straight line. Here, the above-mentioned border line, for example, the border line 40, which are located on "n" number of cells, are designated to have respective cell numbers $X_i$ (i=1, 2, . . . , n). $X_i$ represents an actual border line. Here, n represents the number of samples.

The degree of edge-irregularity σ, which corresponds to the image-quality data y, is found from the following equation (2):

$$\sigma = \{\Sigma[(X_i-X_o)^2]/n\}^{1/2} \qquad (2),$$

that is, $$\sigma = \{[(X_1-X_o)^2+(X_2-X_o)^2+ \ldots +(X_n-X_o)^2]/n\}^{1/2}.$$

Here, σ represents the standard deviation value of $X_i$.

By carrying out sampling processes several times (N times), the above-mentioned operations, that is, the operations from sampling to calculations of the degree of edge-irregularity are carried out N times ($\sigma_1$ to $\sigma_N$) (S7). In this case, the operations were carried out ten times. Then, the average value of 10 σs was obtained (S8).

Additionally, since the line image 31 has two border lines 40 and 41 on the respective right and left sides of its line, the above-mentioned calculations are carried out not only on the border line 40, but also on the border line 41. Here, for convenience of explanation, an explanation will be given of only the border line 40 on one side.

With respect to one line image, the above-mentioned measurements were carried out on a plurality of magnifications, that is, cell sizes x (=$d_1$), and the values of σ were obtained in the same manner (S1 through S8). In this case, with respect to each of the cell sizes x, that is, 6.00, 10.45, 16.50 and 21.30 (μm), the degree of edge-irregularity σ was measured. The results are shown in Table 1 and a graph of FIG. 8. Here, in the graph, the degree of edge-irregularity is represented by y.

TABLE 1

| | No. | Cell Size x (μm) | | | |
|---|---|---|---|---|---|
| σ | | 6.00 | 10.45 | 16.50 | 21.30 |
| (μm) | 1 | 16.95 | 15.77 | 14.65 | 13.54 |
| | 2 | 16.95 | 14.76 | 14.40 | 14.35 |
| | 3 | 17.18 | 14.79 | 13.63 | 12.33 |
| | 4 | 18.18 | 14.96 | 12.93 | 13.45 |
| | 5 | 17.46 | 16.63 | 15.48 | 13.80 |
| | 6 | 17.53 | 15.59 | 13.98 | 13.70 |
| | 7 | 17.17 | 15.41 | 13.22 | 13.30 |
| | 8 | 16.78 | 15.34 | 13.49 | 11.91 |
| | 9 | 17.41 | 15.63 | 13.56 | 13.41 |
| | 10 | 18.63 | 16.18 | 13.54 | 13.41 |
| | AVE. | 17.42 | 15.51 | 13.89 | 13.32 |

Calculations Using Regression Equation

Next, in the operations unit 6, a regression equation he highest correlation with the obtained x and σ is found by using the minimum square method. In other words, a regression line f(x) that is represented by the words, a regression equation (3) (S9):

$$f(x) = A \cdot Ln(x) + (Cr1) \qquad (3)$$

The minimum square method is a calculation method for finding coefficients (in this case, A and Cr1) such as to minimize the sum of squares of the deviations (that is, the remainders) between measured values and calculated values obtained from the regression equation.

In the above-mentioned regression equation (3), Ln represents a natural logarithm. Further, A and Cr1 are constants that are not dependent on x and σ. With respect to the graph, A represents a gradient. Moreover, A represents image-quality data (in this case, the degree of edge-irregularity) per unit length, that is, per cell size x (=$d_1$), and is an increase rate of the degree of edge-irregularity with respect to the cell size. Consequently, A represents a spacial frequency of the image.

Cr1 is a y-coordinate (intercept) at an intersection between the regression line and x=1, that is, the y-axis.

As a result of calculations, A=−3.3039 and Cr1=23.295 are obtained. Therefore, at this time, the regression equation is represented as follows:

$$f(x) = -3.3039 Ln(x) + 23.295 \qquad (4)$$

Figure 8:
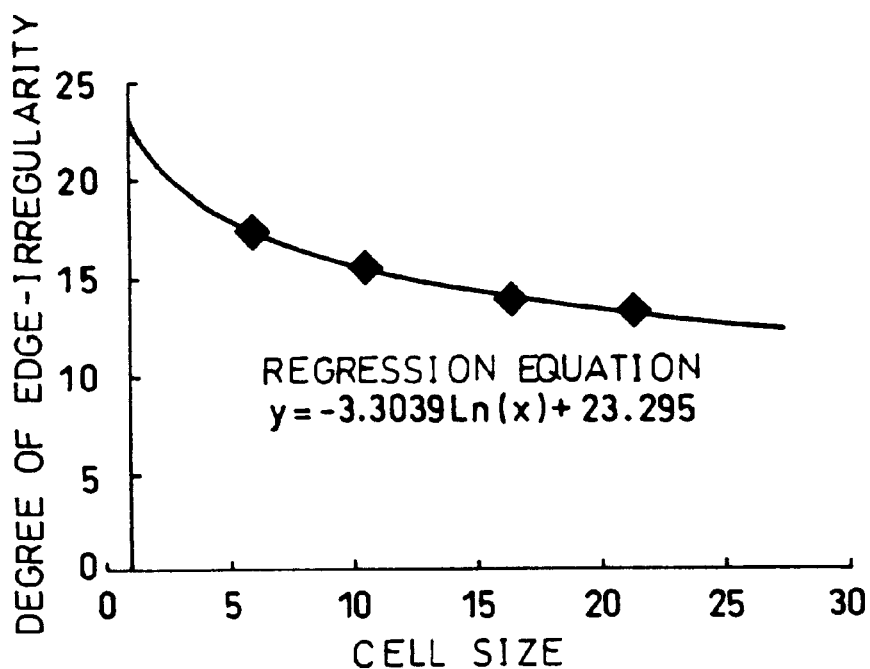
FIG. 8 is a graph that shows the relationship between the cell size and the degree of edge-irregularity and the corresponding regression equation.

The regression equation is shown in the aforementioned graph of FIG. 8. Here, these constants have specific values depending on the line quality, line width and density of the line image.

Correction of Measured Values

Furthermore, in the present embodiment, the degree of edge-irregularity σ, obtained as described above as measured values, are corrected as follows:

When the cell size x is 1, that is, when it is the hypothetical reference value of magnification, namely, the reference magnification (the ideal magnification or the target magnification), f(x)=Cr1 holds; and Cr1 at this time is defined as the reference degree of irregularity (the ideal degree of irregularity or the target degree of irregularity) (S10).

Next, in the present embodiment, without proceeding to S12, the values of σ in the respective cell sizes are converted into Cr1' (conversion function) by using the following conversion equation (5)(S11):

$$Cr' = \alpha A \cdot Ln(x) \qquad (5)$$

Figure 9:
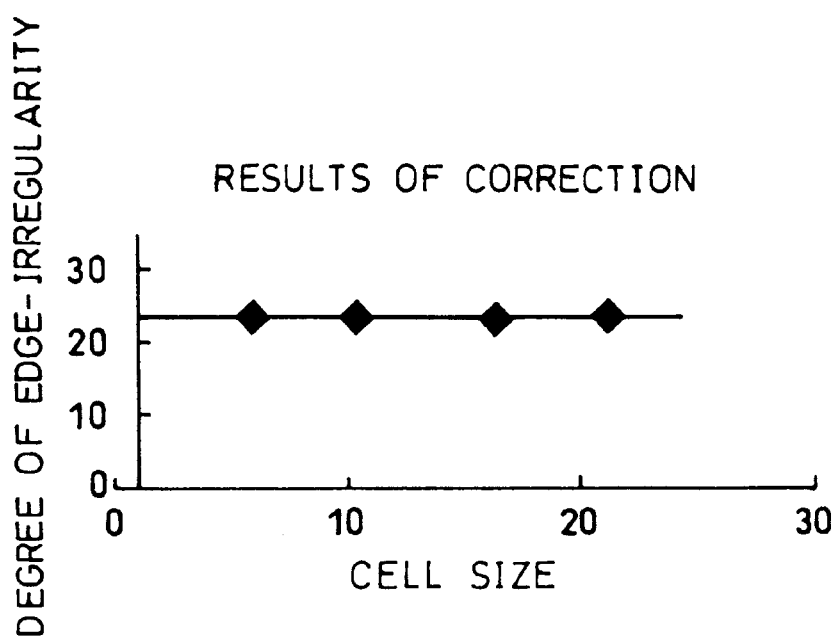
FIG. 9 is a graph that shows the relationship between the cell size and the degree of edge-irregularity after a data-conversion process.

The results thus obtained are shown in Table 2 and a graph in FIG. 9.

TABLE 2

| Target of Data Conversion | |
|---|---|
| Cell Size x | Target Value Cr1 |
| 1.00 | 23.295 |
| Data after Conversion | |
| Cell Size x | Corrected Value Cr1' |
| 6.00 | 23.34 |
| 10.45 | 23.26 |
| 16.50 | 23.15 |
| 21.30 | 23.43 |

As described above, in the present embodiment, assuming the ideal (x=1) measured value (Cr1=23.295), the measured values were standardized by using the value as a target.

As described earlier, A represents a gradient of the above-mentioned regression line that was found from various values of x and σ. Therefore, the conversion is carried out in an equivalent manner, and as is indicated by Table 2, Cr1' represents the standardized degree of edge-irregularity irrespective of the cell size x. Thus, by using the standardized degree of edge-irregularity, it becomes possible to compare degrees of edge-irregularity in an equivalent manner, even if they were obtained by measurements using different magnifications. In other words, it is possible to make comparisons of image-quality data in the same manner as if they were measured using a single magnification (resolution).

Embodiment 2

Figure 1:
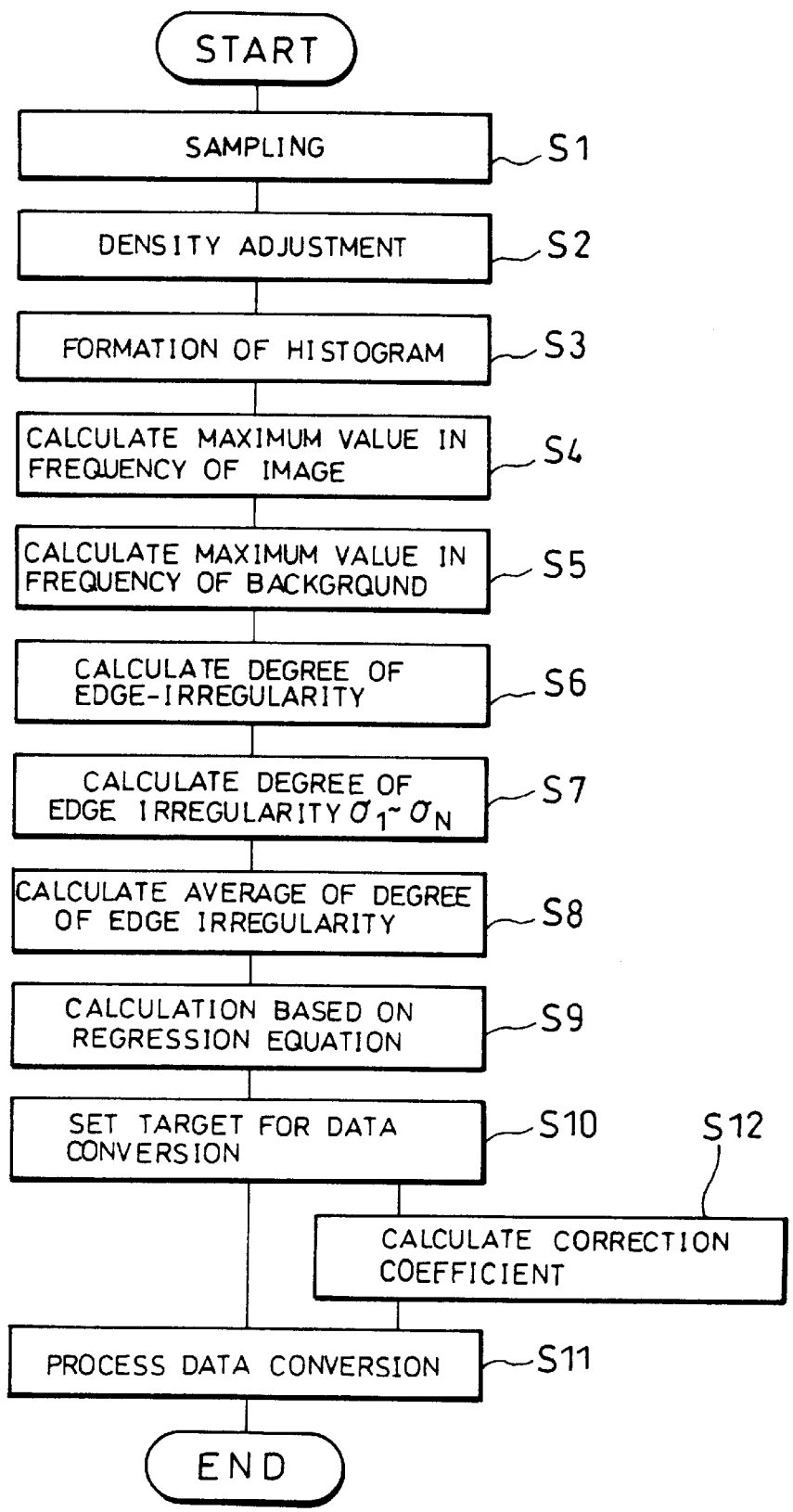
FIG. 1 is a flow chart that shows measuring and correcting processes of image-quality data in one structural example of an image-quality measuring method in accordance with the present invention.
Figure 10:
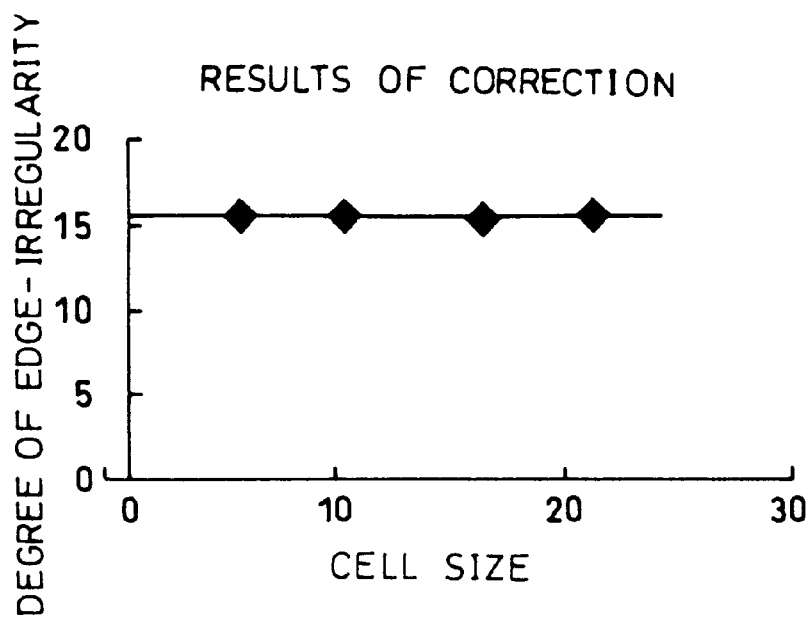
FIG. 10 is a graph that shows the relationship between the cell size and the degree of edge-irregularity after a data-conversion process.

Referring to FIGS. 1 and 10, the following description will discuss another embodiment of the present invention. Here, for convenience of explanation, those members that have the same functions as the members shown in the drawings of the aforementioned embodiment are indicated by the same reference numerals, and the explanations thereof are omitted.

Here, the degree of edge-irregularity of a line image is measured as image-quality data in the same manner as Embodiment 1. Processes up to the section "CALCULATIONS USING REGRESSION EQUATION" were carried out in the same manner as Embodiment 1. In other words, the sequence proceeded to S9 in accordance with the flow chart of FIG. 1. As a result, A=−3.3039 and Cr1=23.295 were obtained.

Correction of Measured Values

Furthermore, in the present embodiment, the measured values, obtained as described above, are corrected as follows:

The degree of edge-irregularity $\sigma$ ($y_i$), obtained when the cell size x shows a specific measured value $x_i$ within the measured values (see Table 1), is defined as the reference degree of irregularity (the ideal degree of irregularity or the target irregularity) (S10). In this case, $x_i$=10.45, and $y_i$=15.51 are selected as reference values.

Next, a correction coefficient $k_i$ is found in accordance with the following equation (6)(S12):

$$k_i = Cr1 - y_i \qquad (6)$$

Thus, $k_i$=7.79 is obtained.

Then, the values of $\sigma$ in the respective cell sizes are converted into Crpi by using the following conversion equation (7)(S11):

$$Crpi = \sigma - A \cdot Ln(x) - k_i \qquad (7)$$

The results thus obtained are shown in Table 3 and a graph in FIG. 10.

TABLE 3

| Target of Data Conversion | |
|---|---|
| Cell Size $x_i$ | Target Value $y_i$ |
| 10.45 | 15.51 |

| Date after Conversion | |
|---|---|
| Cell Size x | Corrected Value Crpi |
| 6.00 | 15.55 |
| 10.45 | 15.54 |
| 16.50 | 15.36 |
| 21.30 | 15.64 |

As described earlier, A represents a gradient of the above-mentioned regression line that was found from various values of x and $\sigma$. Therefore, the conversion is carried out in an equivalent manner, and as is indicated by Table 3, Crpi represents the standardized degree of edge-irregularity irrespective of the cell size x. Thus, by using the standardized degree of edge-irregularity, it becomes possible to compare degrees of edge-irregularity in an equivalent manner, even if they were obtained by measurements using different magnifications.

In the present embodiment, the values ($x_i$=10.45, $y_i$=15.51), which were obtained through the actual measurements, are used as targets so as to standardize the measured values. In other words, the image quality data, obtained in one measurement system, are standardized by using as targets desired reference values obtained in the system. For this reason, this method is particularly effective in cases, such as, for example, standardization of a company's data.

Embodiment 3

Figure 11:
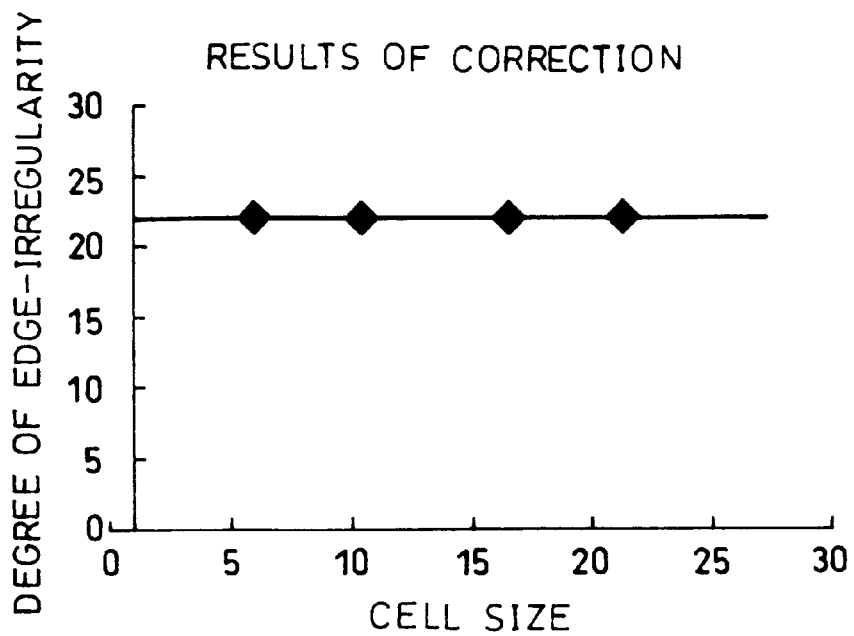
FIG. 11 is a graph that shows the relationship between the cell size and the degree of edge-irregularity after a data-conversion process.

Referring to FIGS. 1 and 11, the following description will discuss another embodiment of the present invention. Here, for convenience of explanation, those members that have the same functions as the members shown in the drawings of the aforementioned embodiment are indicated by the same reference numerals, and the explanations thereof are omitted.

Here, the degree of edge-irregularity of a line image is measured as image-quality data in the same manner as Embodiment 1. Processes up to the section "CALCULA-TIONS USING REGRESSION EQUATION" were carried out in the same manner as Embodiment 1. In other words, the sequence proceeded to S9 in accordance with the flow chart of FIG. 1. As a result, A=−3.3039 and Cr1=23.295 were obtained.

Correction of Measured Values

Furthermore, in the present embodiment, the measured values, obtained as described above, are corrected as follows:

The degree of edge-irregularity $\sigma$ ($y_s$), obtained when the cell size x shows a specific measured value $x_s$ other than the above-mentioned measured values, is defined as the reference degree of irregularity (the ideal degree of irregularity or the target irregularity) (S10). This value can be incorporated from a test chart or other sources. In this case, $x_s$=3.80, and $y_s$=17.59 are selected as reference values.

Next, a correction coefficient k1 is found in accordance with the following equation (8) (S12):

$$k1 = Cr1 - y_s + A \cdot Ln(x_s) \qquad (8)$$

Thus, k1=1.29429 is obtained.

Then, the values of $\sigma$ in the respective cell sizes are converted into Crp1 by using the following conversion equation (9) (S11):

$$Crp1 = \sigma - A \cdot Ln(x) - k1 \qquad (9)$$

The results thus obtained are shown in Table 4 and a graph in FIG. 11.

TABLE 4

| Target of Data Conversion | |
|---|---|
| Cell Size $x_s$ | Target Value $y_s$ |
| 3.80 | 17.59 |

| Data after Conversion | |
|---|---|
| Cell Size x | Corrected Value Crp1 |
| 6.00 | 22.05 |
| 10.45 | 21.96 |
| 16.50 | 21.86 |
| 21.30 | 22.13 |

As described earlier, A represents a gradient of the above-mentioned regression line that was found from various values of x and $\sigma$. Therefore, the conversion is carried out in an equivalent manner, and as is indicated by Table 4, Crp1 represents the standardized degree of edge-irregularity irrespective of the cell size x. Thus, by using the standardized degree of edge-irregularity, it becomes possible to compare degrees of edge-irregularity in an equivalent manner, even if they were obtained by measurements using different magnifications.

In the present embodiment, the values ($x_s$=3.80, $y_s$=17.59), which were externally obtained without conducting actual measurements, are used as targets so as to standardize the measured values. For this reason, this method is particularly effective in such a case when the standardization of image-quality data is carried out by using values from a test chart or other sources.

Embodiment 4

Figure 12:
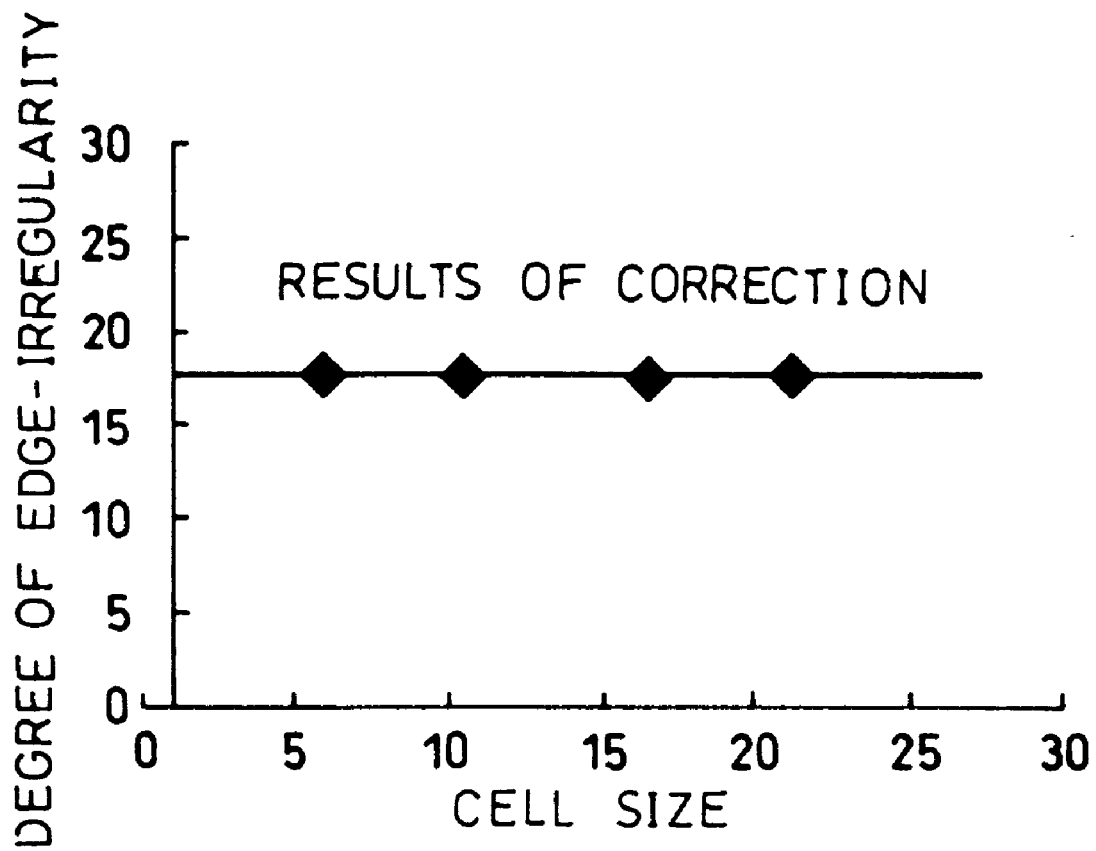
FIG. 12 is a graph that shows the relationship between the cell size and the degree of edge-irregularity after a data-conversion process.

Referring to FIGS. 1 and 12, the following description will discuss another embodiment of the present invention. Here, for convenience of explanation, those members that have the same functions as the members shown in the drawings of the aforementioned embodiment are indicated by the same reference numerals, and the explanations thereof are omitted.

Here, the degree of edge-irregularity of a line image is measured as image-quality data in the same manner as Embodiment 1. Processes up to the section "CALCULATIONS USING REGRESSION EQUATION" were carried out in the same manner as Embodiment 1. In other words, the sequence proceeded to S9 in accordance with the flow chart of FIG. 1. As a result, A=−3.3039 and Cr1=23.295 were obtained.

Correction of Measured Values

Furthermore, in the present embodiment, the measured values, obtained as described above, are corrected as follows:

The degree of edge-irregularity $\sigma$ ($y_s$), obtained when the cell size x shows a specific measured value $x_s$ other than the above-mentioned measured values, is defined as the reference degree of irregularity (the ideal degree of irregularity or the target irregularity) (S10). This value can be incorporated from a test chart or other sources. In this case, $x_s$=3.80, and $y_s$=17.59 are selected as reference values.

Next, a correction coefficient $k_s$ is found in accordance with the following equation (10) (S12):

$$k = Cr1 - y_s \tag{10}$$

Thus, $k_s$=5.705 is obtained.

Then, the values of $\sigma$ in the respective cell sizes are converted into Crps by using the following conversion equation (11) (S11):

$$Crps = \sigma - A \cdot Ln(x) - k_s \tag{11}$$

The results thus obtained are shown in Table 5 and a graph in FIG. 12.

TABLE 5

| Target of Data Conversion | |
|---|---|
| Cell Size $x_s$ | Target Value $y_s$ |
| 3.80 | 17.59 |
| Data after Conversion | |
| Cell Size x | Corrected Value Crps |
| 6.00 | 17.64 |
| 10.45 | 17.55 |
| 16.50 | 17.45 |
| 21.30 | 17.72 |

As described earlier, A represents a gradient of the above-mentioned regression line that was found from various values of x and $\sigma$. Therefore, the conversion is carried out in an equivalent manner, and as is indicated by Table 5, Crps represents the standardized degree of edge-irregularity irrespective of the cell size x. Thus, by using the standardized degree of edge-irregularity, it becomes possible to compare degrees of edge-irregularity in an equivalent manner, even if they were obtained by measurements using different magnifications.

In the present embodiment, the values ($x_s$=3.80, $y_s$=17.59), which were externally obtained without conducting actual measurements, are used as targets so as to standardize the measured values. For this reason, this method is particularly effective in such a case when the standardization of image-quality data is carried out by using values from a test chart or other sources.

Moreover, this method allows equivalent comparisons with even values obtained from a test chart.

Embodiment 5

Referring to FIGS. 13 through 18, the following description will discuss another embodiment of the present invention. Here, for convenience of explanation, those members that have the same functions as the members shown in the drawings of the aforementioned embodiment are indicated by the same reference numerals, and the explanations thereof are omitted.

Here, in embodiments 5 through 8, different from the aforementioned embodiments, the degree of edge-blurredness of a line image is measured as image-quality data.

Figure 13:
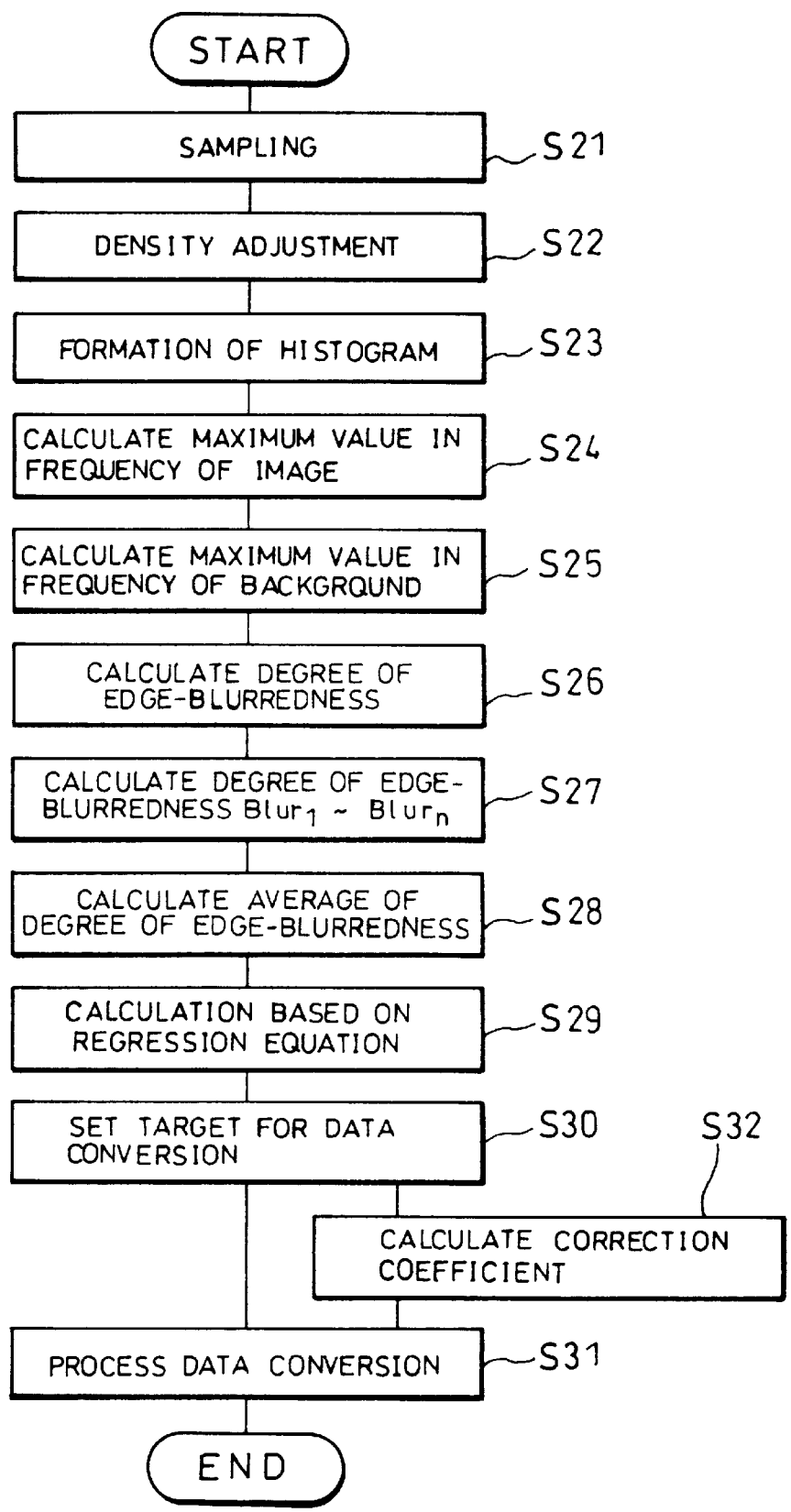
FIG. 13 is a flow chart that shows measuring and correcting processes of image-quality data in another structural example of an image-quality measuring method in accordance with the present invention.

The sequence of processes is carried out in accordance with a flow chart shown in FIG. 13. In other words, processes up to the section "IDENTIFICATION OF LINE IMAGE" are carried out in the same manner as Embodiment 1 (S21 through S25).

Determining the Degree of Edge-Blurredness

Figure 16:
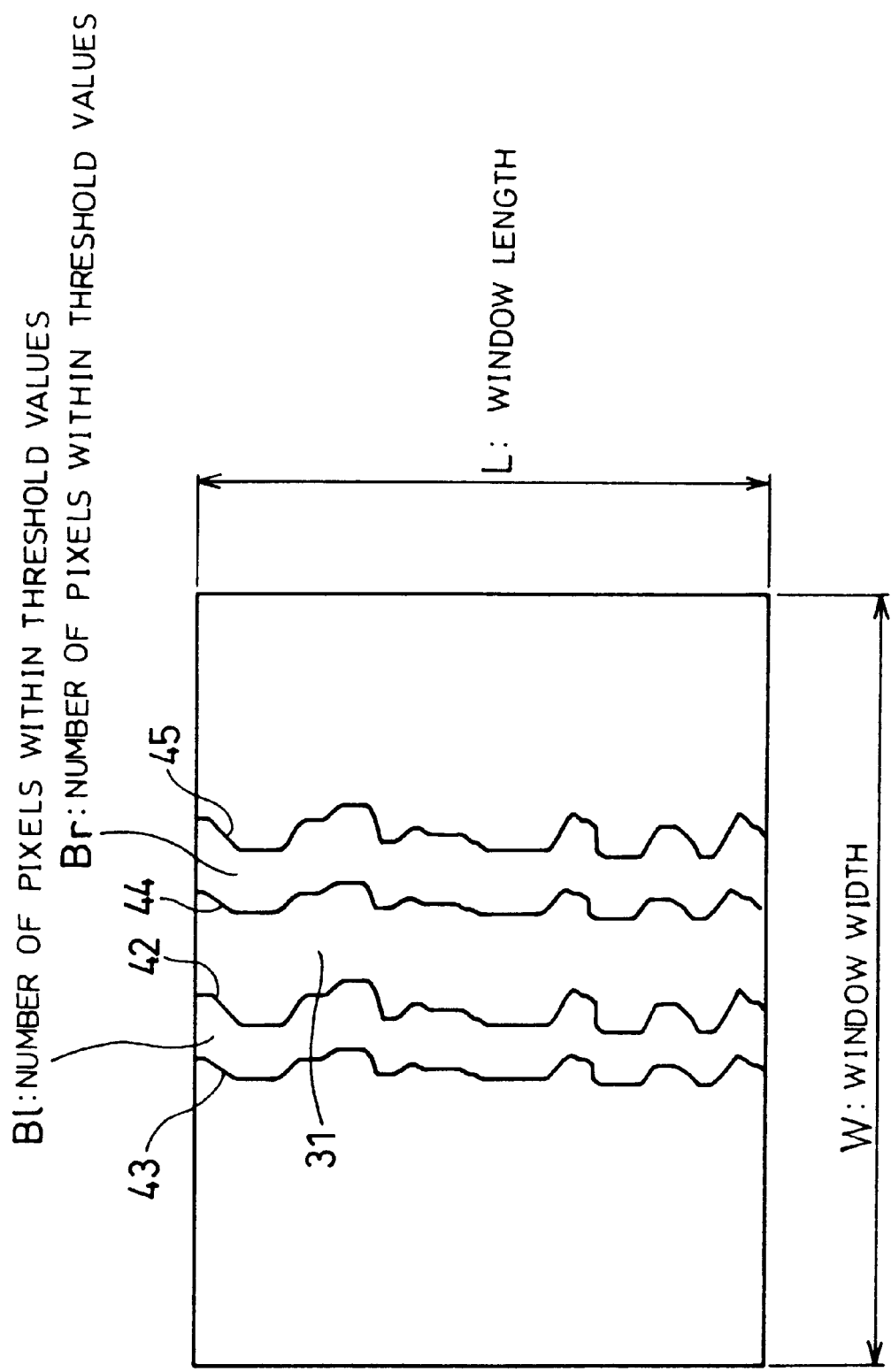
FIG. 16 is an explanatory drawing that shows the degree of edge-blurredness in the window.

The degree of edge-blurredness of a line image is determined as follows (S26):

The border lines 40 and 41 (see FIG. 7) of the line image 31 are found in a manner as described in Embodiment 1; however, the actual states of the border lines are illustrated in FIG. 16. In other words, in the line image 31, a portion, enclosed by lines 42 and 44, has high density, and forms a clear portion as a line. In contrast, a portion on one side, enclosed by lines 42 and 43, and a portion on the other side, enclosed by lines 44 and 45, both have relatively low density, and form portions (blurred portions) that are relatively too unclear to be identified as lines.

Figure 14:
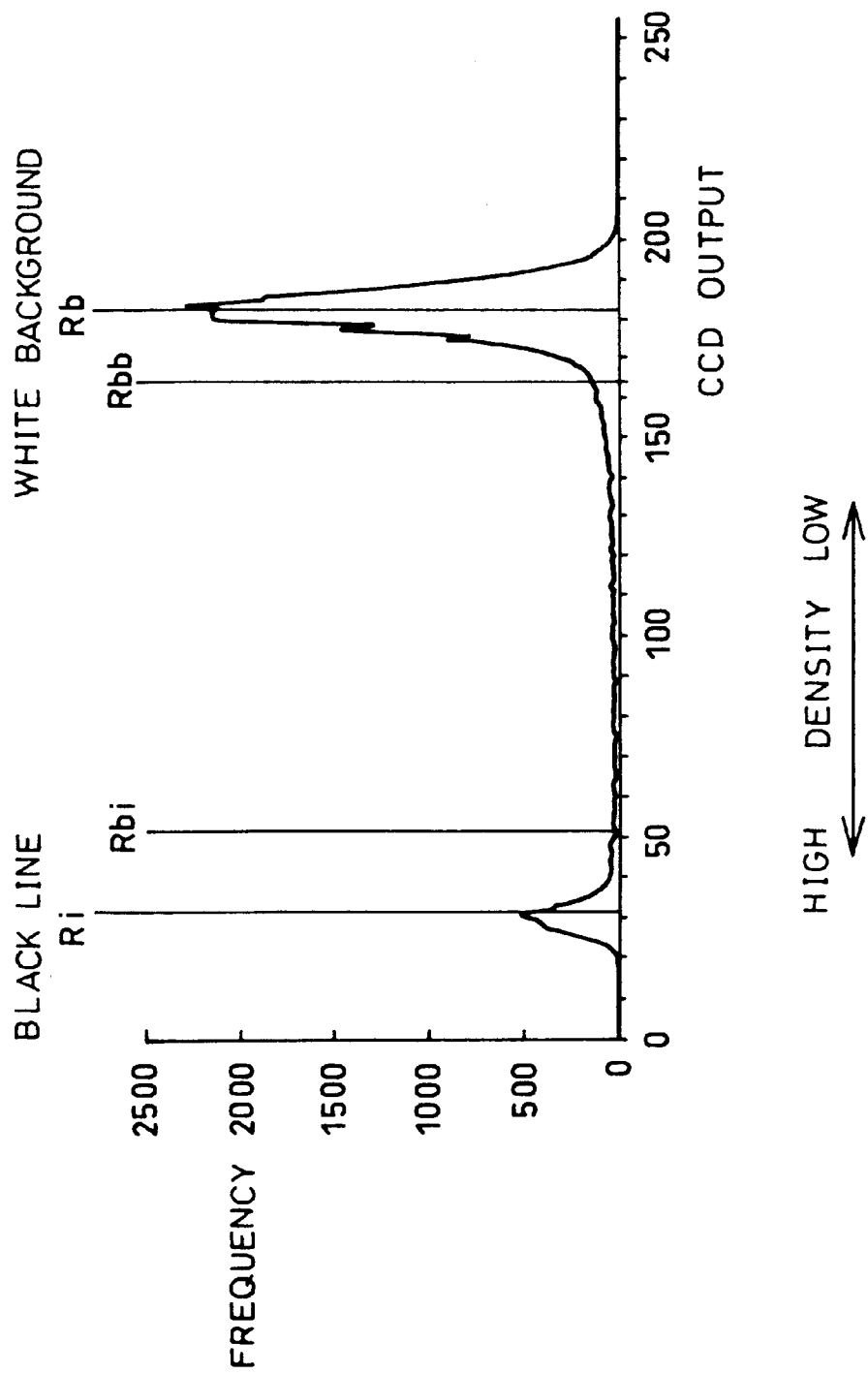
FIG. 14 is an explanatory drawing that shows the relationship between the gray scales and frequency in the window.

As illustrated in FIG. 14, in order to specify the blurredness, a third density Rbi that is slightly thinner than the first density Ri and a fourth density Rbb that is slightly thicker than the second density Rb (Rbi>Rbb) are defined. Here, the way in which the above definition is made is not specifically limited.

Next, as illustrated in FIG. 16, between lines 44 and 45, that is, on one side (on the right side in the drawing) of the line image 31, the number Br (the number of pixels within the threshold values) of cells whose densities are located between Rbi and Rbb is found. In the same manner, between lines 42 and 43, that is, on the other side (on the left side in the drawing) of the line image 31, the number Bl (the number of pixels within the threshold values) of cells whose densities are located between Rbi and Bbb is found.

Figure 15:
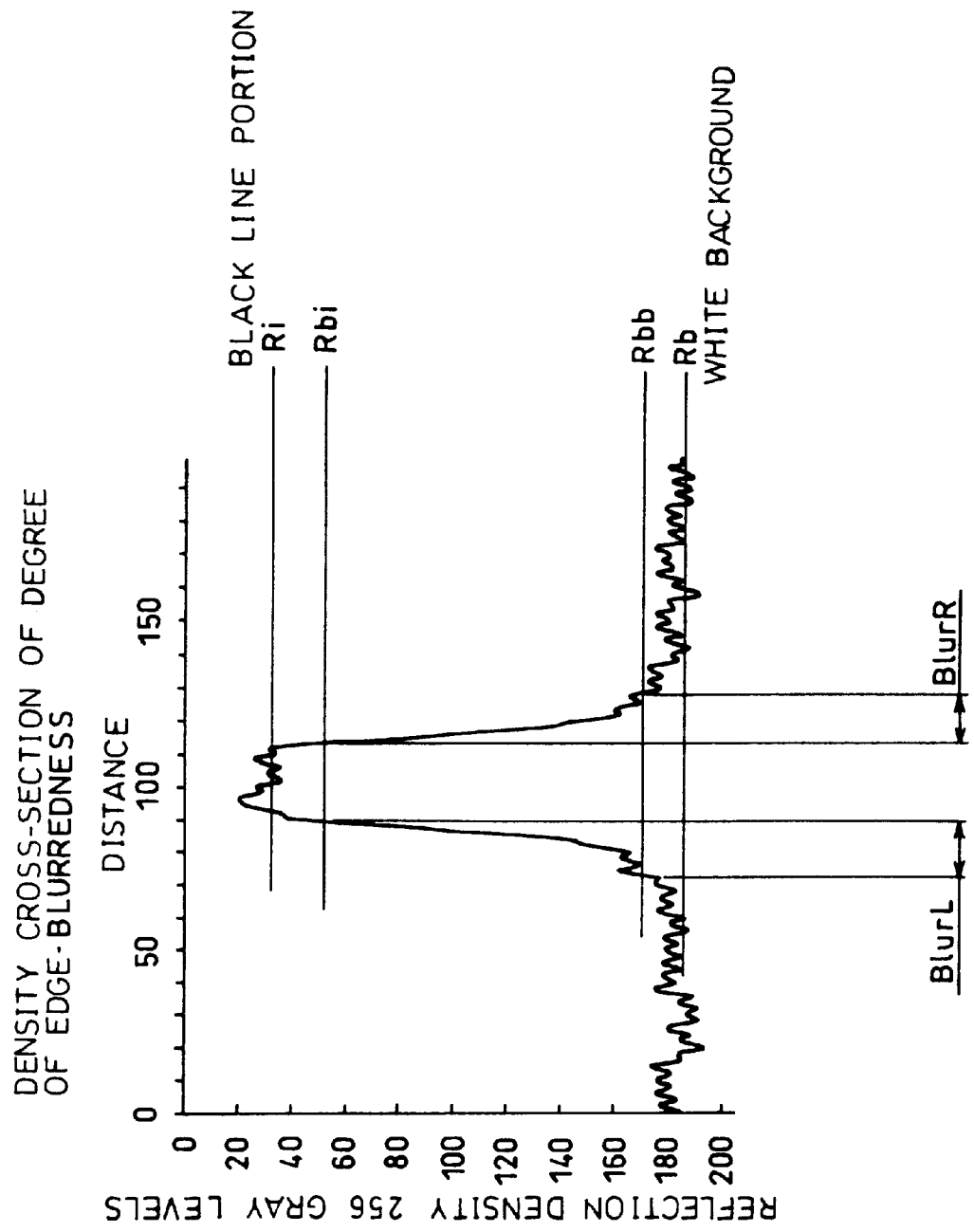
FIG. 15 is an explanatory drawing that shows the relationship between the position in a first direction along horizontal scanning lines and the gray scales in the window.

Next, as shown in FIG. 15, the degrees of edge-blurredness on the right and left sides, BlurL and BlurR, are found in accordance with the following equations (12) and (13):

$$BlurL = d_1 Bl/L \tag{12}$$

$$BlurR = d_1 Br/L \tag{13}$$

FIG. 15 shows the relationship between the gray scales and distances from one end of the window frames to the respective cells, that is, the density cross-section representing the degree of edge-blurredness. In the drawing, the distance is represented by the standard deviation using the unit $\mu$m.

Here, an explanation will be given below of the degree of edge-blurredness which can be seen typically on only one side of either the right-side or left-side, and for convenience of explanation, the degree of edge-blurredness is represented by Blur.

By carrying out sampling processes several times (n times), the above-mentioned operations, that is, the operations from sampling to calculations of the degree of edge-blurredness are carried out n times ($Blur_1$ to $Blur_n$) (S27). In this case, the operations were carried out ten times. Then, the average value of 10 Blurs was obtained (S28).

With respect to one line image, the above-mentioned measurements were carried out on a plurality of magnifications, that is, cell sizes x (=$d_1$), and the values of Blurs were obtained in the same manner (S21 through S28). In this case, with respect to each of the cell sizes x, that is 6.00, 10.45, 16.50 and 21.30 ($\mu$m), the degree of edge-blurredness Blur was measured. The results are shown in Table 6 and a graph of FIG. 17. Here, in the graph, the degree of edge-blurredness is represented by y.

TABLE 6

| | No. | Cell Size x ($\mu$m) | | | |
|---|---|---|---|---|---|
| Blur | | 6.00 | 10.45 | 16.50 | 21.30 |
| ($\mu$m) | 1 | 75.90 | 93.90 | 97.90 | 107.80 |
| | 2 | 79.80 | 92.50 | 108.70 | 106.90 |
| | 3 | 76.60 | 91.80 | 103.30 | 113.10 |
| | 4 | 75.30 | 87.50 | 100.50 | 109.20 |
| | 5 | 75.30 | 89.90 | 106.20 | 113.70 |
| | 6 | 78.60 | 90.80 | 108.90 | 107.40 |
| | 7 | 79.80 | 90.60 | 102.90 | 111.80 |
| | 8 | 76.90 | 88.60 | 109.80 | 112.00 |
| | 9 | 75.90 | 95.00 | 110.70 | 108.40 |
| | 10 | 75.50 | 91.40 | 109.50 | 110.60 |
| | AVE. | 76.96 | 91.20 | 105.84 | 110.09 |

Calculations Using Regression Equation

Next in the operations unit 6, a regression equation which has the highest correlation with the obtained x and Blur is found by using the minimum square method. In other words, a regression line f(x) that is represented by the following regression equation (14) is found (S29):

$$f(x) = A \cdot Ln(x) + Cb1 \tag{14}$$

In the above-mentioned regression equation (14), Ln represents a natural logarithm in the same manner as Embodiment 1. Further, A and Cb1 are constants that are not dependent on x and Blur. With respect to the graph, A represents a gradient. Moreover, A represents image-quality data (in this case, the degree of edge-blurredness) per unit length, that is, per cell size x (=$d_1$), and is an increase rate of the degree of edge-blurredness with respect to the cell size. Consequently, A represents a spacial frequency of the image.

Cb1 is a y-coordinate (intercept) at an intersection between the regression line and x=1, that is, the y-axis.

As a result of calculations, A=26.986 and Cb1=28.555 are obtained. Therefore, at this time, the regression equation is represented as follows:

$$f(x) = 26.986 Ln(x) + 28.555 \tag{4}$$

Figure 17:
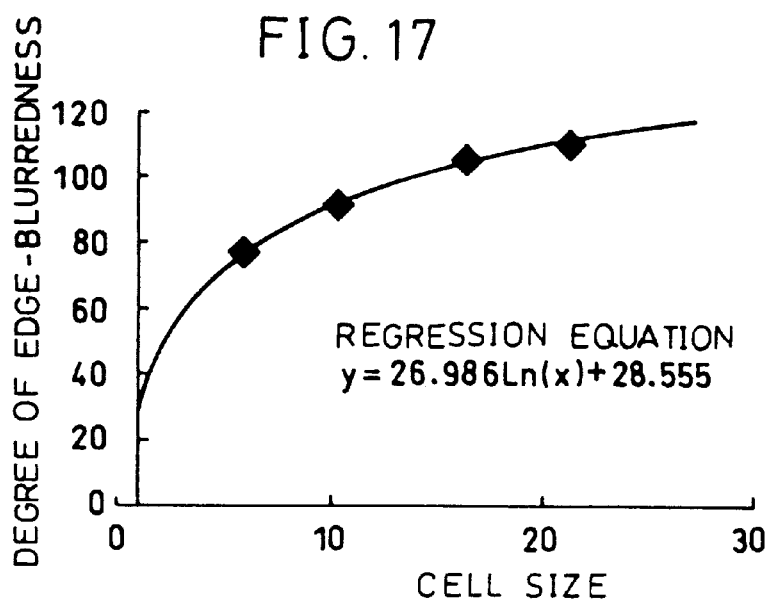
FIG. 17 is a graph that shows the relationship between the cell size and the degree of edge-blurredness and the corresponding regression equation.

The regression equation is shown in the aforementioned graph of FIG. 17. Here, these constants have specific values depending on the line quality, line width and density of the line image.

Correction of Measured Values

Furthermore, in the present embodiment, the degree of edge-blurredness Blur, obtained as described above as measured values, are corrected as follows:

When the cell size x is 1, that is, when it is the hypothetical reference value of magnification, namely, the reference magnification (the ideal magnification or the target magnification), f(x)=Cb1 holds; and Cb1 at this time is defined as the reference degree of blurredness (the ideal degree of blurredness or the target degree of blurredness) (S30).

Next, in the present embodiment, without proceeding to S32, the values of Blur in the respective cell sizes are converted into Cb1' (conversion function) by using the following conversion equation (16)(S31):

$$Cb1' = Blur - A \cdot Ln(x) \tag{16}$$

Figure 18:
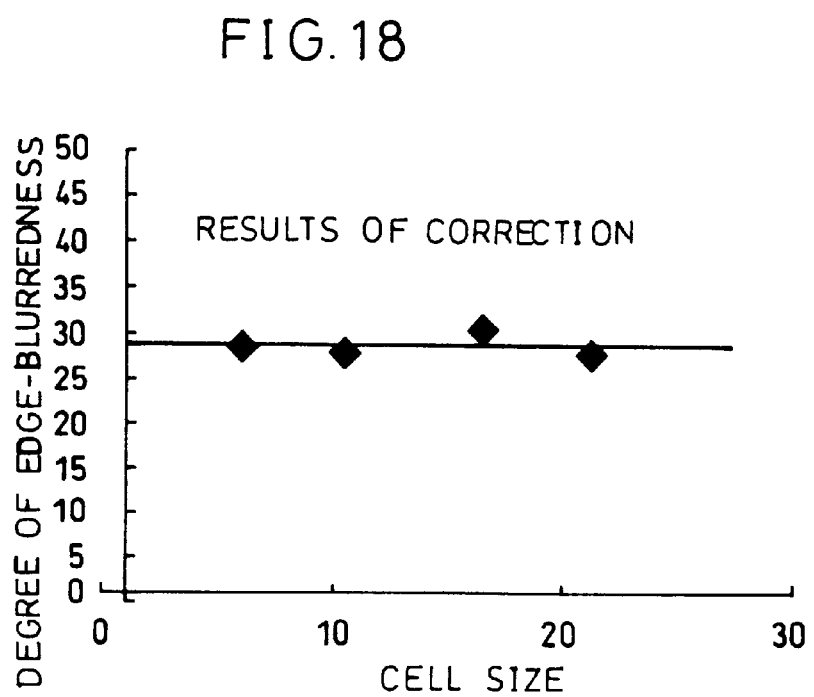
FIG. 18 is a graph that shows the relationship between the cell size and the degree of edge-blurredness after a data-conversion process.

The results thus obtained are shown in Table 7 and a graph in FIG. 18.

TABLE 7

| Target of Data Conversion | |
|---|---|
| Cell Size x | Target Value Cb1 |
| 1.00 | 28.555 |
| Data after Conversion | |
| Cell Size x | Corrected Value Cb1' |
| 6.00 | 28.61 |
| 10.45 | 27.87 |
| 16.50 | 30.19 |
| 21.30 | 27.55 |

As described above, in the present embodiment, assuming the ideal (x=1) measured value (Cb1=28.555), the measured values were standardized by using the value as a target.

As described earlier, A represents a gradient of the above-mentioned regression line that was found from various values of x and Blur. Therefore, the conversion is carried out in an equivalent manner, and as is indicated by Table 7, Cb1' represents the standardized degree of edge-blurredness irrespective of the cell size x. Thus, by using the standardized degree of edge-blurredness, it becomes possible to compare degrees of edge-blurredness in an equivalent manner, even if they were obtained by measurements using different magnifications. In other words, it is possible to make comparisons of image-quality data in the same manner as if they were measured using a single magnification (resolution).

Embodiment 6

Figure 19:
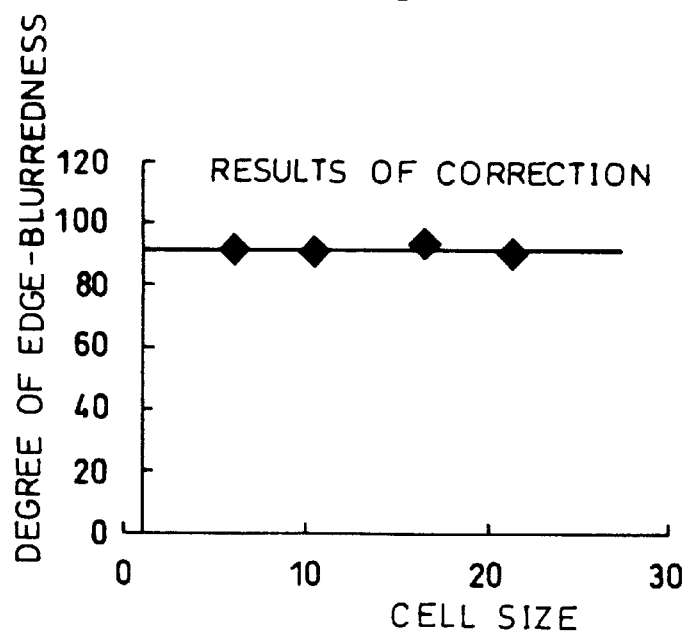
FIG. 19 is a graph that shows the relationship between the cell size and the degree of edge-blurredness after a data-conversion process.

Referring to FIGS. 13 and 19, the following description will discuss another embodiment of the present invention. Here, for convenience of explanation, those members that have the same functions as the members shown in the drawings of the aforementioned embodiment are indicated by the same reference numerals, and the explanations thereof are omitted.

Here, the degree of edge-blurredness of a line image is measured as image-quality data in the same manner as Embodiment 5. Processes up to the section "CALCULATIONS USING REGRESSION EQUATION" were carried out in the same manner as Embodiment 5. In other words, the sequence proceeded to S29 in accordance with the flow chart of FIG. 13. As a result, A=26.986 and Cb1=28.555 were obtained.

Correction of Measured Values

Furthermore, in the present embodiment, the measured values, obtained as described above, are corrected as follows:

The degree of edge-blurredness Blur ($y_i$), obtained when the cell size x shows a specific measured value $x_i$ within the measured values (see Table 6), is defined as the reference degree of blurredness (the ideal degree of blurredness or the target blurredness) (S30). In this case, $x_i$=10.45, and $y_i$=91.20 are selected as reference values.

Next, a correction coefficient $k_i$ is found in accordance with the following equation (17) (S32):

$$k_i = y_i - Cb1 \quad (17)$$

Thus, $k_i$=62.65 is obtained.

Then, the values of Blur in the respective cell sizes are converted into Cbpi by using the following conversion equation (18)(S31):

$$Cbpi = Blur - A \cdot Ln(x) + k_i \quad (18)$$

The results thus obtained are shown in Table 8 and a graph in FIG. 19.

TABLE 8

| Target of Data Conversion | |
| --- | --- |
| Cell Size $X_i$ | Target Value $y_i$ |
| 10.45 | 91.20 |

| Data after Conversion | |
| --- | --- |
| Cell Size x | Corrected Value Cbpi |
| 6.00 | 91.25 |
| 10.45 | 90.52 |
| 16.50 | 92.83 |
| 21.30 | 90.19 |

As described earlier, A represents a gradient of the above-mentioned regression line that was found from various values of x and Blur. Therefore, the conversion is carried out in an equivalent manner, and as is indicated by Table 8, Cbpi represents the standardized degree of edge-blurredness irrespective of the cell size x. Thus, by using the standardized degree of edge-blurredness, it becomes possible to compare degrees of edge-blurredness in an equivalent manner, even if they were obtained by measurements using different magnifications.

In the present embodiment, the values ($x_i$=10.45, $y_i$=91.20), which were obtained through the actual measurements, are used as targets so as to standardize the measured values. In other words, the image quality data, obtained in one measurement system, are standardized by using as targets desired reference values obtained in the system. For this reason, this method is particularly effective in cases, such as, for example, standardization of a company's data.

Embodiment 7

Figure 20:
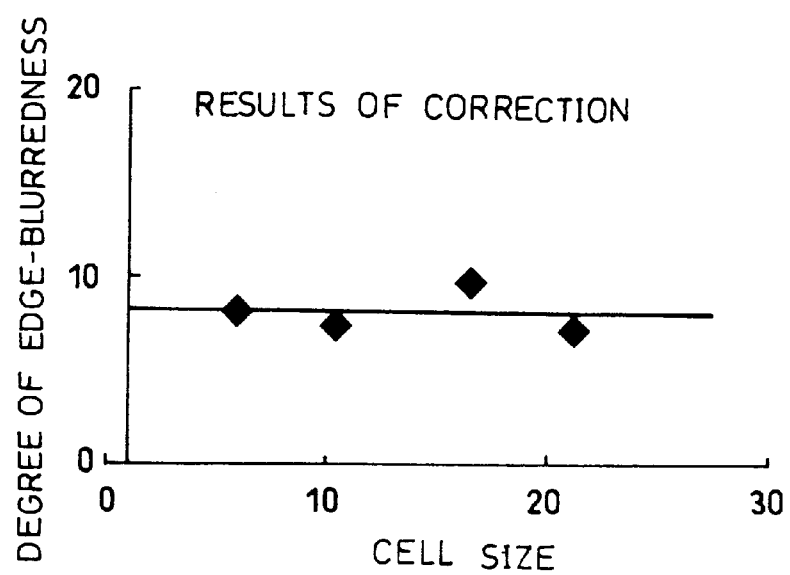
FIG. 20 is a graph that shows the relationship between the cell size and the degree of edge-blurredness after a data-conversion process.

Referring to FIGS. 13 and 20, the following description will discuss another embodiment of the present invention. Here, for convenience of explanation, those members that have the same functions as the members shown in the drawings of the aforementioned embodiment are indicated by the same reference numerals, and the explanation thereof are omitted.

Here, the degree of edge-blurredness of a line image is measured as image-quality data in the same manner as Embodiment 5. Processes up to the section "CALCULATIONS USING REGRESSION EQUATION" were carried out in the same manner as Embodiment 5. In other words, the sequence proceeded to S29 in accordance with the flow chart of FIG. 13. As a result, A=26.986 and Cb1=28.555 were obtained.

Correction of Measured Values

Furthermore, in the present embodiment, the measured values, obtained as described above, are corrected as follows:

The degree of edge-blurredness Blur ($y_s$), obtained when the cell size x shows a specific measured value $x_s$ other than the above-mentioned measured values, is defined as the reference degree of blurredness (the ideal degree of blurredness or the target blurredness) (S30). This value can be incorporated from a test chart or other sources. In this case, $x_s$=3.80, and $y_s$=44.10 are selected as reference values.

Next, a correction coefficient k1 is found in accordance with the following equation (19) (S32):

$$k1 \; Cb1 - y_s + A \cdot Ln(x) \quad (19)$$

Thus, k1=20.48 is obtained.

Then, the values of Blur in the respective cell sizes are converted into Cbp1 by using the following conversion equation (20) (S31):

$$Cbp1 = Blur - A \cdot Ln(x) - k1 \quad (20)$$

The results thus obtained are shown in Table 9 and a graph in FIG. 20.

TABLE 9

| Target of Data Conversion | |
| --- | --- |
| Cell Size $x_s$ | Target Value $y_s$ |
| 3.80 | 44.10 |

| Data after Conversion | |
| --- | --- |
| Cell Size x | Corrected Value Cbpl |
| 6.00 | 8.13 |
| 10.45 | 7.39 |
| 16.50 | 9.71 |
| 21.30 | 7.07 |

As described earlier, A represents a gradient of the above-mentioned regression line that was found from various values of x and Blur. Therefore, the conversion is carried out in an equivalent manner, and as is indicated by Table 9, Cbp1 represents the standardized degree of edge-blurredness irrespective of the cell size x. Thus, by using the standardized degree of edge-blurredness, it becomes possible to compare degrees of edge-blurredness in an equivalent manner, even if they were obtained by measurements using different magnifications.

In the present embodiment, the values ($x_s$=3.80, $y_s$=44.10), which were externally obtained without conducting actual measurements, are used as targets so as to standardize the measured values. For this reason, this method is particularly effective in such a case when the standardization of image-quality data is carried out by using values from a test chart or other sources.

Embodiment 8

Figure 21:
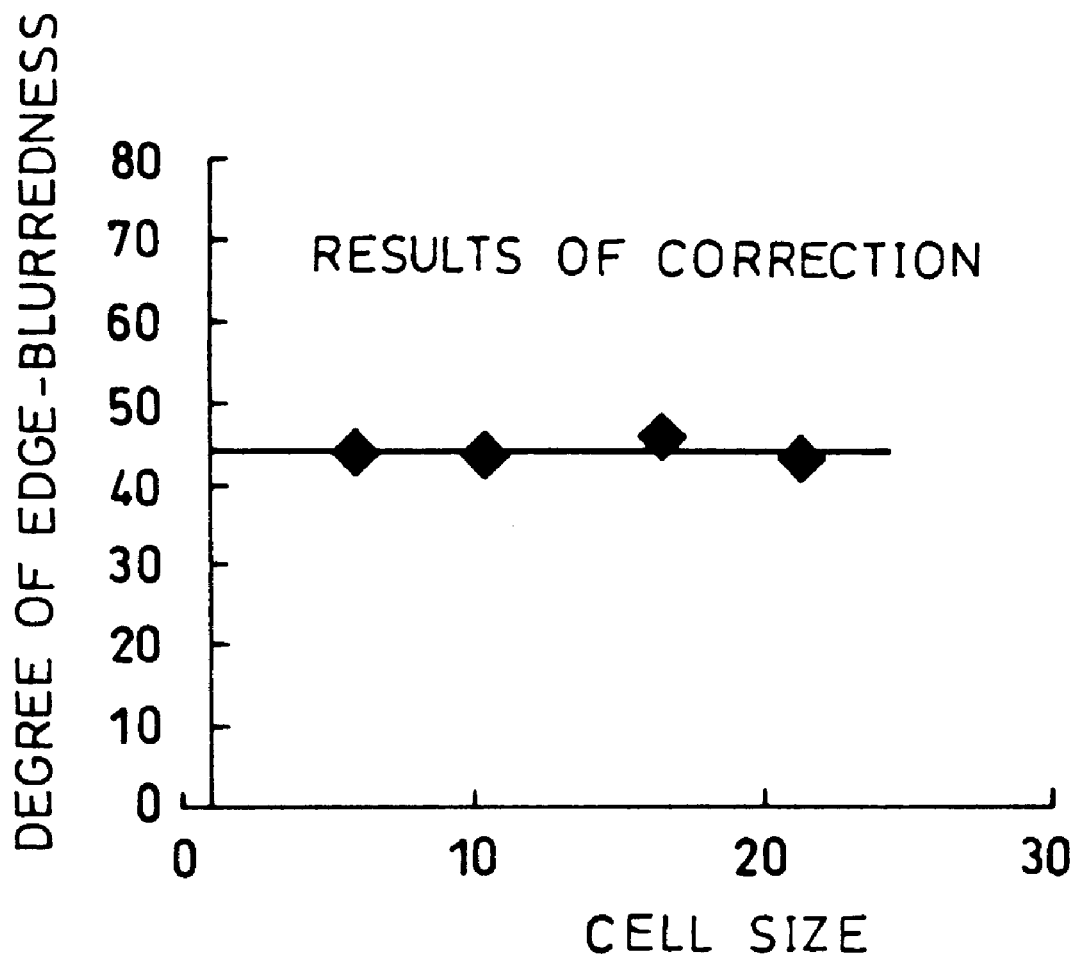
FIG. 21 is a graph that shows the relationship between the cell size and the degree of edge-blurredness after a data-conversion process.

Referring to FIGS. 13 and 21, the following description will discuss another embodiment of the present invention. Here, for convenience of explanation, those members that have the same functions as the members shown in the drawings of the aforementioned embodiment are indicated by the same reference numerals, and the explanations thereof are omitted.

Here, the degree of edge-blurredness of a line image is measured as image-quality data in the same manner as Embodiment 5. Processes up to the section "CALCULATIONS USING REGRESSION EQUATION" were carried out in the same manner as Embodiment 5. In other words, the sequence proceeded to S29 in accordance with the flow chart of FIG. 13. As a result, A=26.986 and Cb1=28.555 were obtained.

Correction of Measured Values

Furthermore, in the present embodiment, the measured values, obtained as described above, are corrected as follows:

The degree of edge-blurredness Blur ($y_s$), obtained when the cell size x shows a specific measured value $x_s$ other than the above-mentioned measured values, is defined as the reference degree of blurredness (the ideal degree of blurredness or the target blurredness) (S30). This value can be incorporated from a test chart or other sources. In this case, $x_s$=3.80, and $y_s$=44.10 are selected as reference values.

Next, a correction coefficient $k_s$ is found in accordance with the following equation (21) (S32):

$$k_s = Cb1 - y_s \quad (21)$$

Thus, $k_s$=−15.55 is obtained.

Then, the values of Blur in the respective cell sizes are converted into Cbps by using the following conversion equation (22) (S31):

$$Cbps = Blur - A \cdot Ln(x) - k_s \quad (22)$$

The results thus obtained are shown in Table 10 and a graph in FIG. 21.

TABLE 10

| Target of Data Conversion | |
|---|---|
| Cell Size $x_s$ | Target Value $y_s$ |
| 3.80 | 44.10 |

| Data after Conversion | |
|---|---|
| Cell Size x | Corrected Value Cbps |
| 6.00 | 44.15 |
| 10.45 | 43.42 |
| 16.50 | 45.73 |
| 21.30 | 43.09 |

As described earlier, A represents a gradient of the above-mentioned regression line that was found from various values of x and Blur. Therefore, the conversion is carried out in an equivalent manner, and as is indicated by Table 10, Cbps represents the standardized degree of edge-blurredness irrespective of the cell size x. Thus, by using the standardized degree of edge-blurredness, it becomes possible to compare degrees of edge-blurredness in an equivalent manner, even if they were obtained by measurements using different magnifications.

In the present embodiment, the values ($x_s$=3.80, $y_s$=44.10), which were externally obtained without conducting actual measurements, are used as targets so as to standardize the measured values. For this reason, this method is particularly effective in such a case when the standardization of image-quality data is carried out by using values from a test chart or other sources.

Moreover, this method allows equivalent comparisons with even values obtained from a test chart.

Embodiment 9

Referring to FIGS. 22 through 26, the following description will discuss another embodiment of the present invention. Here, for convenience of explanation, those members that have the same functions as the members shown in the drawings of the aforementioned embodiment are indicated by the same reference numerals, and the explanations there are omitted.

Here, in embodiments 9 through 12, different from the aforementioned embodiments, the line width of a line image is measured as image-quality data.

Figure 22:
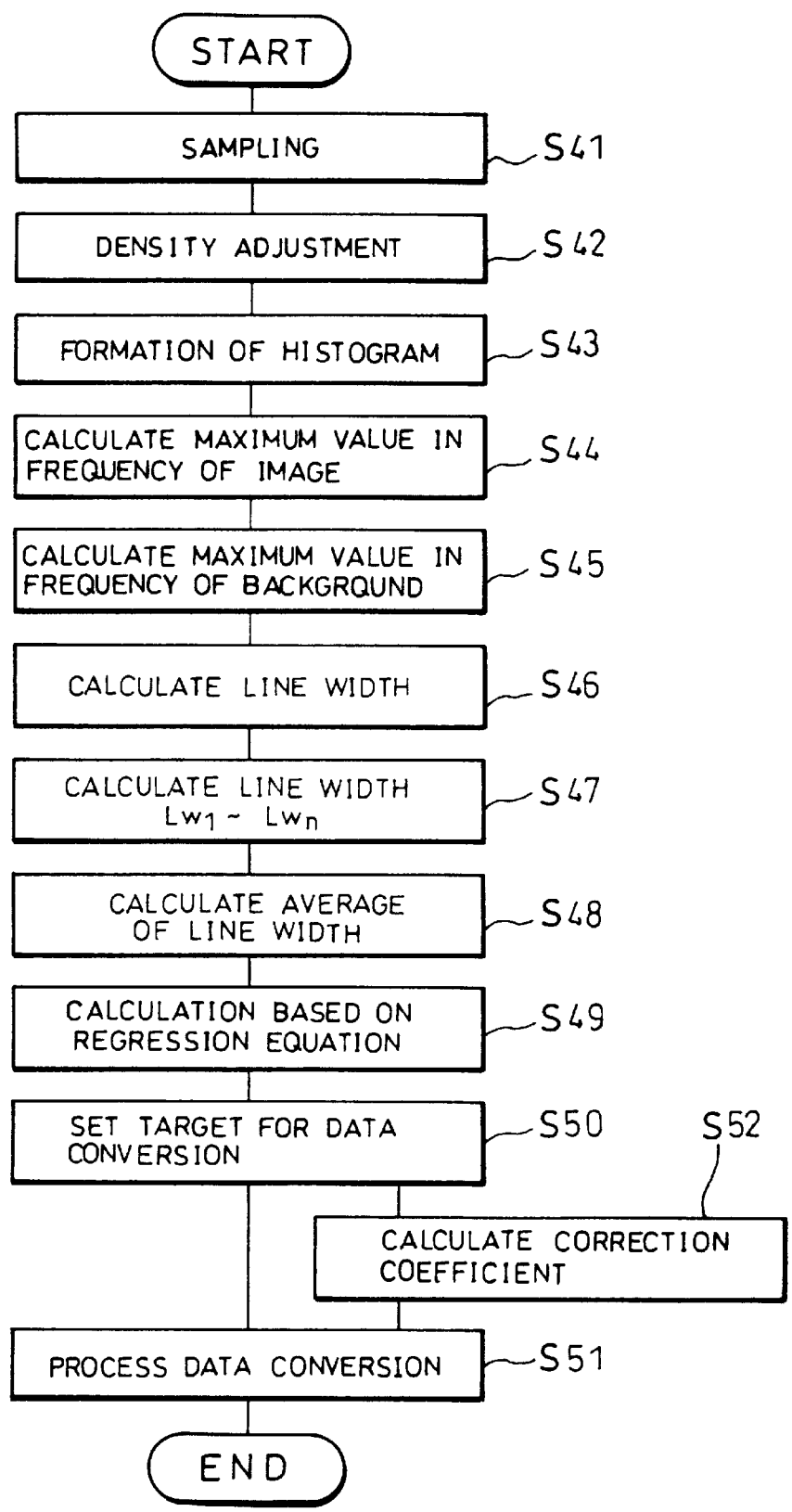
FIG. 22 is a flow chart that shows measuring and correcting processes of image-quality data in the other structural example of an image-quality measuring method in accordance with the present invention.

The sequence of processes is carried out in accordance with a flow chart shown in FIG. 22. In other words, processes up to the section "IDENTIFICATION OF LINE IMAGE" are carried out in the same manner as Embodiment 1 (S41 through S45).

Determining the Width of Line Image

The line width of a line image is determined as follows (S46):

The border lines 40 and 41 of the line image 31 are found in a manner as described earlier; and as illustrated in FIG. 24, the number of cells (the number of pixels within threshold values) located between these border lines including those on the two border lines, that is, the number of cells representing the line image 31, is defined as B. Then, the line width Lw of the Line image is found in accordance with the following equation (23):

$$Lw = d_1 B / L \quad (23)$$

Figure 23:
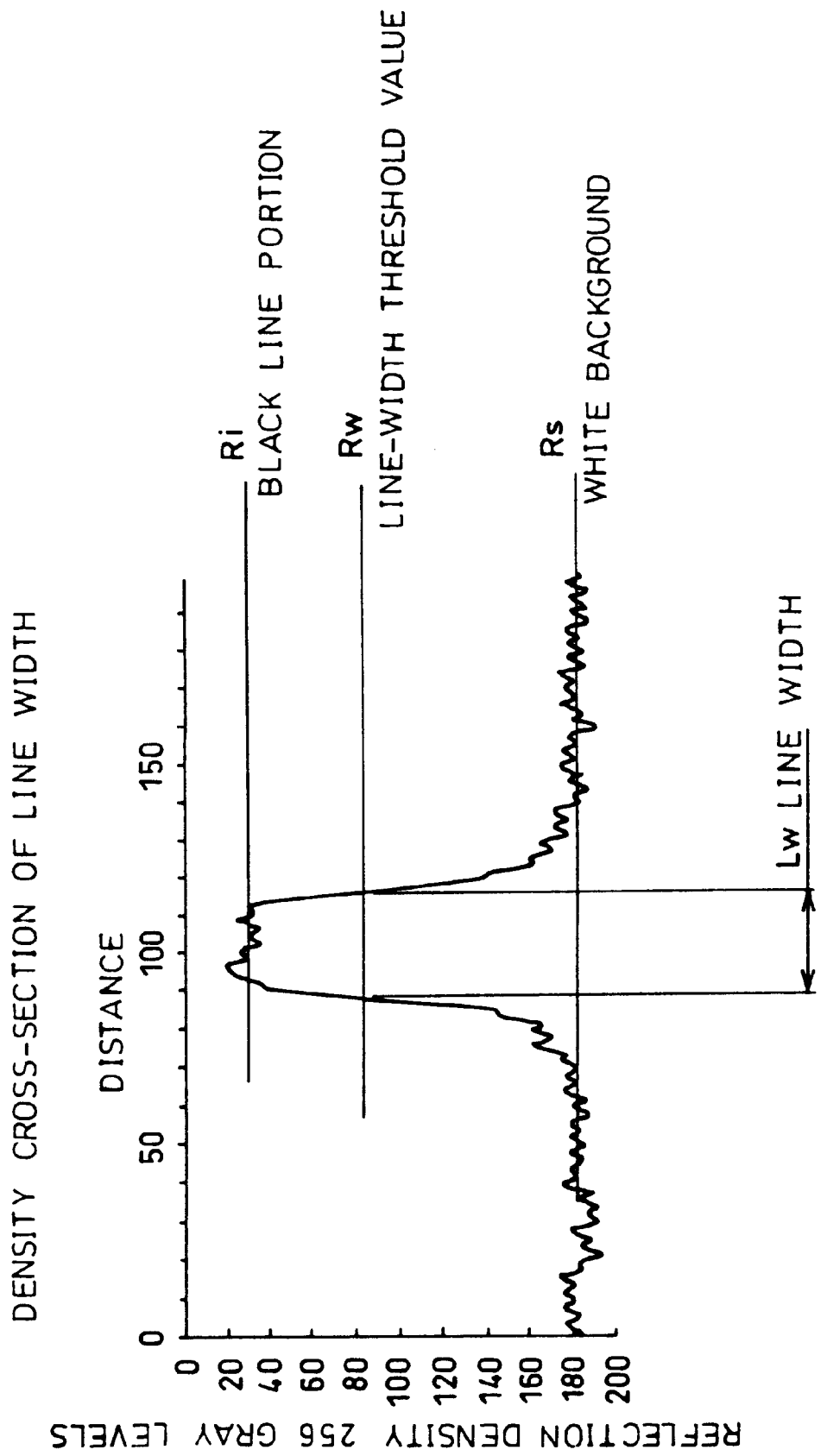
FIG. 23 is an explanatory drawing that shows the relationship between the position in a first direction along horizontal scanning lines and the gray scales in the window.
Figure 24:
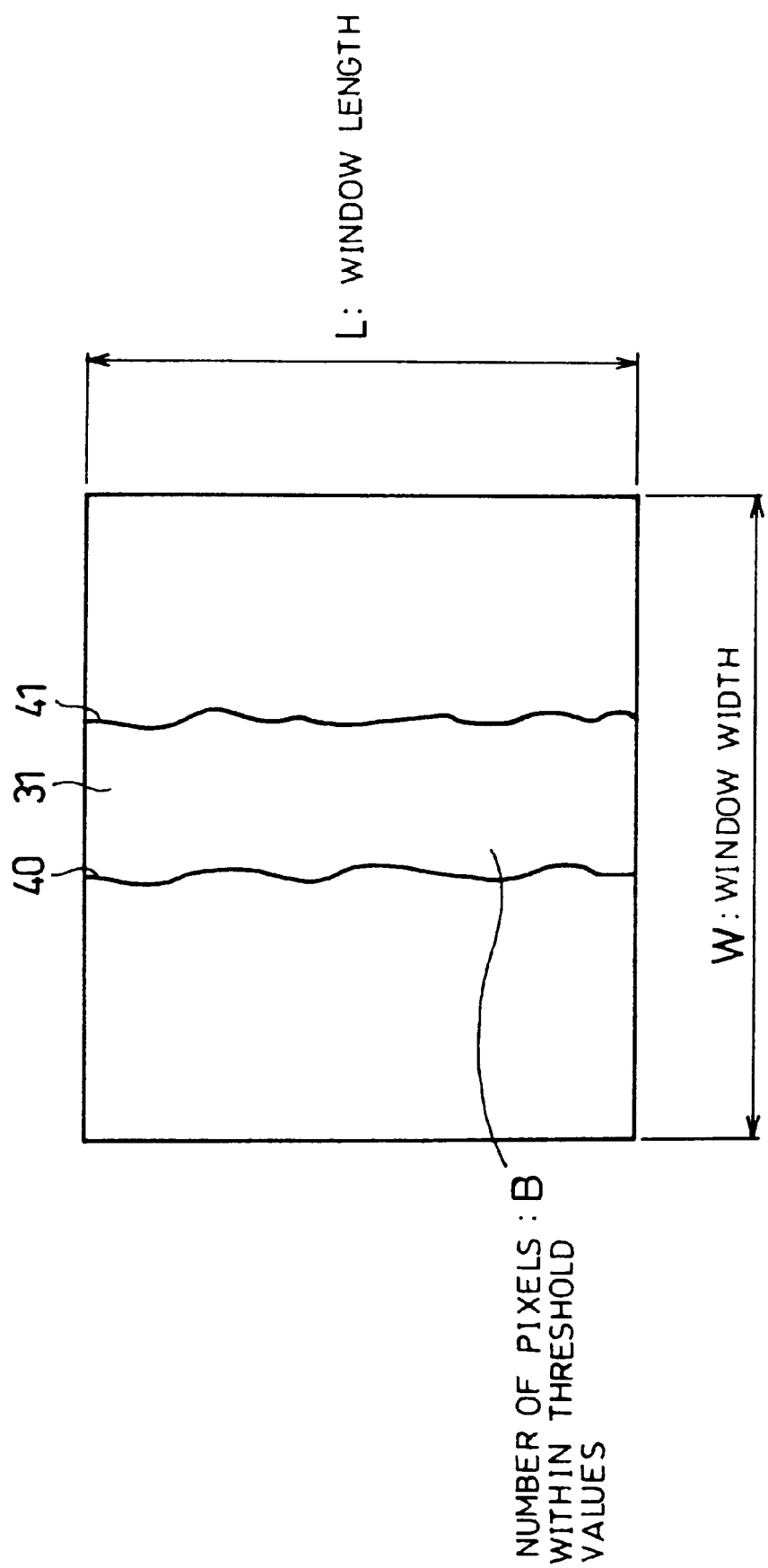
FIG. 24 is an explanatory drawing that shows a line width in the window.

FIG. 23 shows the relationship between the gray scales and distances from one end of the window frames to the respective cells, that is, the density cross-section representing the line width. In the drawing, the distance is represented by the standard deviation using the unit $\mu$m.

By carrying out sampling processes several times (n times), the above-mentioned operations, that is, the operations from sampling to calculations of the line width are carried out n times ($Lw_1$ to $Lw_n$) (S47). In this case, the operations were carried out ten times. Then, the average value of 10 Lws was obtained (S48).

With respect to one line image, the above-mentioned measurements were carried out on a plurality of magnifications, that is, cell sizes x (=$d_1$), and the values of Lws were obtained in the same manner (S41 through S48). In this case, with respect to each of the cell sizes x, that is, 6.00, 10.45, 16.50 and 21.30 ($\mu$m), the line width was measured. The results are shown in Table 11 and a graph of FIG. 25. Here, in the graph, the line width is represented by y.

TABLE 11

| No. | Cell Size x ($\mu$m) | | | |
|---|---|---|---|---|
| Lw | | 6.00 | 10.45 | 16.50 | 21.30 |
| ($\mu$M) | 1 | 124.90 | 127.60 | 131.60 | 128.50 |
| | 2 | 123.80 | 127.20 | 132.60 | 139.50 |
| | 3 | 125.10 | 129.50 | 131.70 | 135.50 |
| | 4 | 126.30 | 129.80 | 132.40 | 137.10 |
| | 5 | 124.30 | 126.90 | 129.60 | 130.60 |
| | 6 | 124.60 | 126.90 | 132.50 | 127.80 |
| | 7 | 125.10 | 128.60 | 131.00 | 127.90 |
| | 8 | 126.50 | 127.20 | 134.00 | 147.30 |
| | 9 | 125.70 | 129.50 | 131.60 | 147.40 |
| | 10 | 126.10 | 127.00 | 131.80 | 134.40 |
| | AVE. | 125.24 | 128.02 | 131.88 | 135.60 |

Calculations Using Regression Equation

Next, in the operations unit 6, a regression equation which has the highest correlation with the obtained x and Lw is found by using the minimum square method. In other words, a regression line f(x) that is represented by the following regression equation (24) is found (S49):

$$f(x) = Ax + Cw_0 \quad (24)$$

In the above-mentioned regression equation (24), A and $Cw_0$ constants that are not dependent on x and Lw. With respect to the graph, A represents a gradient. Moreover, A represents image-quality data (in this case, the line width) per unit length, that is, per cell size x (=$d_1$), and is an increase rate of the line width with respect to the cell size. Consequently, A represents a spacial frequency of the image.

$Cw_0$ is a y-coordinate (intercept) at an intersection between the regression line and x=0, that is, the y-axis. In other words, it represents the image-quality data (in this case, the line width) when, upon measurement, the cell size x is infinitesimal.

As a result of calculations, A=0.6733 and $Cw_0$=121.02 are obtained. Therefore, at this time, the regression equation is represented as follows:

$$f(x)=0.6733x+121.02 \quad (25)$$

Figure 25:
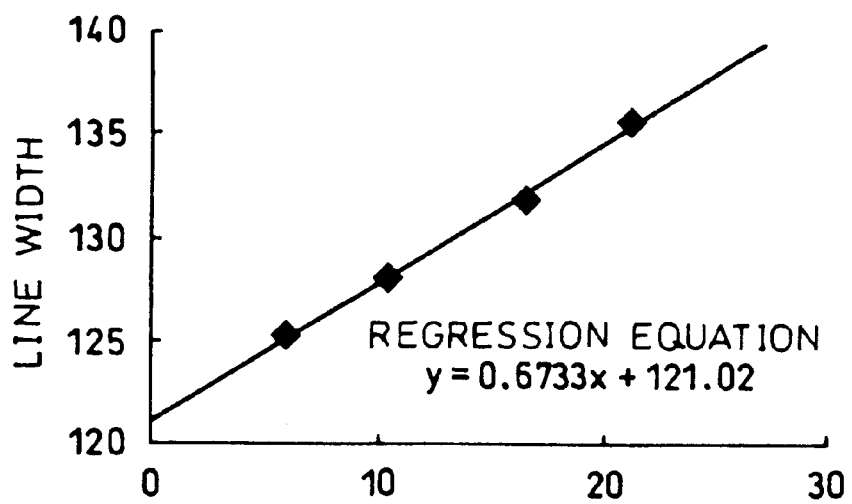
FIG. 25 is a graph that shows the relationship between the cell size and the line width and the corresponding regression equation.

The regression equation is shown in the aforementioned graph of FIG. 25. Here, these constants have specific values depending on the line quality, line width and density of the line image.

Correction of Measured Values

Furthermore, in the present embodiment, the line width Lw, obtained as described above as measured values, are corrected as follows:

When the cell size x is 0, that is, when it is the hypothetical reference value of magnification, namely, the reference magnification (the ideal magnification or the target magnification), $f(x)=Cw_0$ holds; and $Cw_0$ at this time is defined as the reference line width (the ideal line width or the target line width) (S50).

Next, in the present embodiment, without proceeding to S52, the values of Lw in the respective cell sizes are converted into $Cw_0'$ (conversion function) by using the following conversion equation (26) (S51):

$$Cw_0'=Lw-Ax \quad (26)$$

Figure 26:
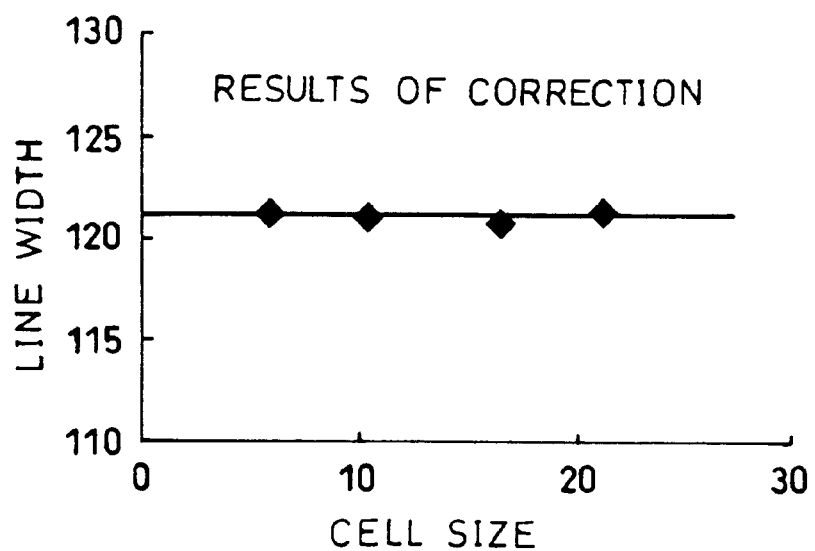
FIG. 26 is a graph that shows the relationship between the cell size and the line width after a data-conversion process.

The results thus obtained are shown in Table 12 and a graph in FIG. 26.

TABLE 12

| Target of Data Conversion | |
|---|---|
| Cell Size x | Target Value $Cw_0$ |
| 0.00 | 121.02 |
| Data after Conversion | |
| Cell Size x | Corrected Value $Cw_0'$ |
| 6.00 | 121.20 |
| 10.45 | 120.98 |
| 16.50 | 120.77 |
| 21.30 | 121.26 |

As described above, in the present embodiment, assuming the ideal (x=0) measured value ($Cw_0$=121.02), the measured values were standardized by using the value as a target.

As described earlier, A represents a gradient of the above-mentioned regression line that was found from various values of x and Lw. Therefore, the conversion is carried out in an equivalent manner, and as is indicated by Table 12, $Cw_0'$ represents the standardized line width irrespective of the cell size x. Thus, by using the standardized line width, it becomes possible to compare line widths in an equivalent manner, even if they were obtained by measurements using different magnifications. In other words, it is possible to make comparisons of image-quality data in the same manner as if they were measured using a single magnification (resolution).

Embodiment 10

Figure 27:
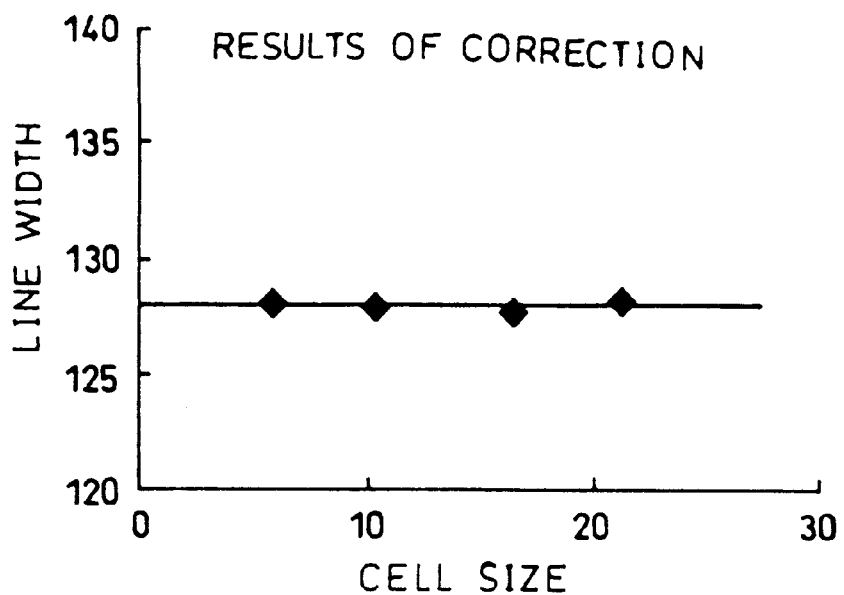
FIG. 27 is a graph that shows the relationship between the cell size and the line width after a data-conversion process.

Referring to FIGS. 22 and 27, the following description will discuss another embodiment of the present invention. Here, for convenience of explanation, those members that have the same functions as the members shown in the drawings of the aforementioned embodiment are indicated by the same reference numerals, and the explanations thereof are omitted.

Here, the degree of edge-blurredness of a line image is measured as image-quality data in the same manner as Embodiment 9. Processes up to the section "CALCULATIONS USING REGRESSION EQUATION" were carried out in the same manner as Embodiment 9. In other words, the sequence proceeded to S49 in accordance with the flow chart of FIG. 22. As a result, A=0.6733 and $Cw_0$=121.02 were obtained.

Correction of Measured Values

Furthermore, in the present embodiment, the measured values, obtained as described above, are corrected as follows:

The degree of edge-blurredness Lw ($y_i$), obtained when the cell size x shows a specific measured value $x_i$ within the measured values (see Table 11), is defined as the reference line width (the ideal degree line width or the target line width) (S50). In this case, $x_i$=10.45, and $y_i$=128.02 are selected as reference values.

Next, a correction coefficient $k_i$ is found in accordance with the following equation (27) (S52):

$$k_i=y_i-Cw_0 \quad (27)$$

Thus, $k_i$=7.00 is obtained.

Then, the values of Lw in the respective cell sizes are converted into Cwpi by using the following conversion equation (28) (S51):

$$Cwpi=Lw-Ax+k_i \quad (28)$$

The results thus obtained are shown in Table 13 and a graph in FIG. 27.

TABLE 13

| Target of Data Conversion | |
|---|---|
| Cell Size $x_i$ | Target Value $y_i$ |
| 10.45 | 128.02 |
| Data after Conversion | |
| Cell Size x | Corrected Value Cwpi |
| 6.00 | 128.14 |
| 10.45 | 127.94 |
| 16.50 | 127.77 |
| 21.30 | 128.24 |

As described earlier, A represents a gradient of the above-mentioned regression line that was found from various values of x and Lw. Therefore, the conversion is carried out in an equivalent manner, and as is indicated by Table 13, Cwpi represents the standardized line width irrespective of the cell size x. Thus, by using the standardized degree of line width, it becomes possible to compare line widths in an equivalent manner, even if they were obtained by measurements using different magnifications.

In the present embodiment, the values ($x_i$=10.45, $y_i$=128.02), which were obtained through the actual measurements, are used as targets so as to standardize the measured values. In other words, the image quality data, obtained in one measurement system, are standardized by using as targets desired reference values obtained in the system. For this reason, this method is particularly effective in cases, such as, for example, standardization of a company's data.

Embodiment 11

Figure 28:
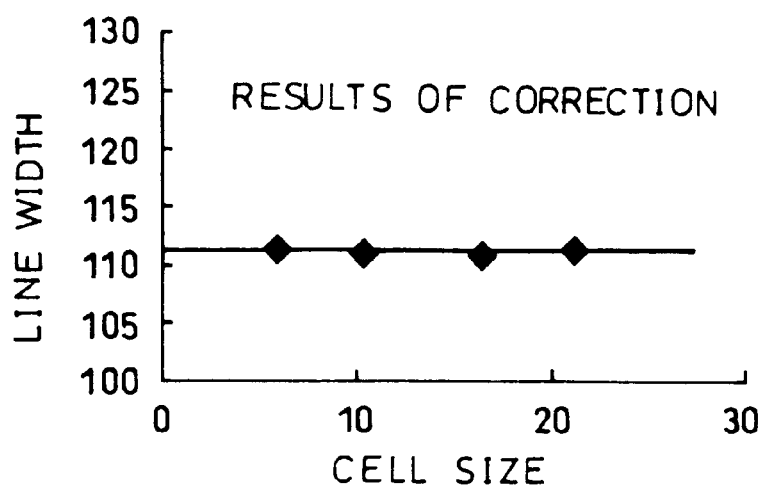
FIG. 28 is a graph that shows the relationship between the cell size and the line width after a data-conversion process.

Referring to FIGS. 22 and 28, the following will description will discuss another embodiment of the present invention. Here, for convenience of explanation, those members that have the same functions as the members shown in the drawings of the aforementioned embodiment are indicated by the same reference numerals, and the explanations thereof are omitted.

Here, the degree of edge-blurredness of a line image is measured as image-quality data in the same manner as Embodiment 9. Processes up to the section "CALCULATIONS USING REGRESSION EQUATION" were carried out in the same manner as Embodiment 9. In other words, the sequence proceeded to S49 in accordance with the flow chart of FIG. 22. As a result, A=0.6733 and $Cw_0$=121.02 were obtained.

Correction of Measured Values

Furthermore, in the present embodiment, the measured values, obtained as described above, are corrected as follows:

The line width Lw ($y_s$), obtained when the cell size x shows a specific measured value $x_s$ other than the above-mentioned measured values, is defined as the reference line width (the ideal line width or the target line width) (S50). This value can be incorporated from a test chart or other sources. In this case, $x_s$=6.00, and $y_s$=115.12 are selected as reference values.

Next, a correction coefficient k1 is found in accordance with the following equation (29) (S52):

$$k1 = Cw_0 - y_s + Ax_s \quad (29)$$

Thus, k1=9.9398 is obtained.

Then, the values of Lw in the respective cell sizes are converted into $Cwp_0$ by using the following conversion equation (30) (S51):

$$Cwp_0 = Lw - Ax - k1 \quad (30)$$

The results thus obtained are shown in Table 14 and a graph in FIG. 28.

TABLE 14

| Target of Data Conversion | |
|---|---|
| Cell Size $x_s$ | Target Value $y_s$ |
| 6.00 | 115.12 |
| Data after Conversion | |
| Cell Size x | Corrected Value $Cwp_0$ |
| 6.00 | 111.22 |
| 10.45 | 111.02 |
| 16.50 | 110.85 |
| 21.30 | 111.32 |

As described earlier, A represents a gradient of the above-mentioned regression line that was found from various values of x and Lw. Therefore, the conversion is carried out in an equivalent manner, and as is indicated by Table 14, $Cwp_0$ represents the standardized line width irrespective of the cell size x. Thus, by using the standardized line width, it becomes possible to compare line widths in an equivalent manner, even if they were obtained by measurements using different magnifications.

In the present embodiment, the values ($x_s$=6.00, $y_s$=115.12), which were externally obtained without conducting actual measurements, are used as targets so as to standardize the measured values. For this reason, this method is particularly effective in such a case when the standardization of image-quality data is carried out by using values from a test chart or other sources.

Embodiment 12

Figure 29:
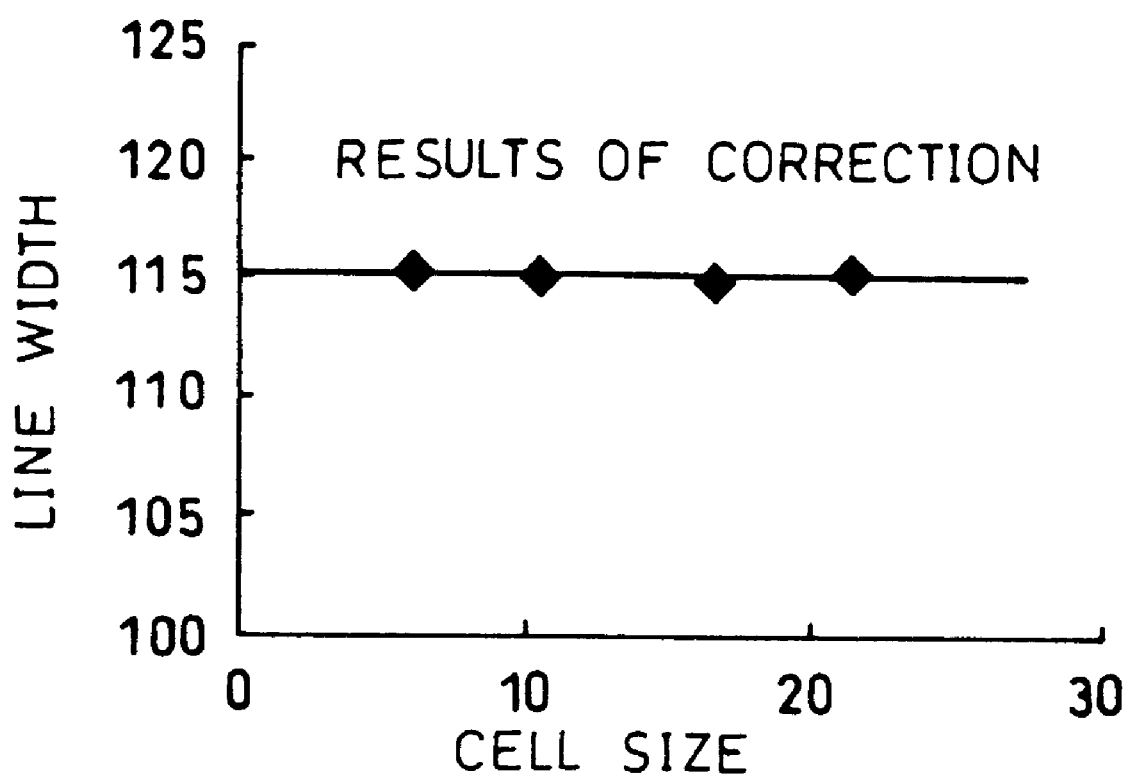
FIG. 29 is a graph that shows the relationship between the cell size and the line width after a data-conversion process.

Referring to FIGS. 22 and 29, the following description will discuss another embodiment of the present invention. Here, for convenience of explanation, those members that have the same functions as the members shown in the drawings of the aforementioned embodiment are indicated by the same reference numerals, and the explanations thereof are omitted.

Here, the degree of edge-blurredness of a line image is measured as image-quality data in the same manner as Embodiment 9. Processes up to the section "CALCULATIONS USING REGRESSION EQUATION" were carried out in the same manner as Embodiment 9. In other words, the sequence proceeded to S49 in accordance with the flow chart of FIG. 22. As a result, A=0.6733 and $Cw_0$=121.02 were obtained.

Correction of Measured Values

Furthermore, in the present embodiment, the measured values, obtained as described above, are corrected as follows:

The degree of edge-blurredness Lw ($y_s$), obtained when the cell size x shows a specific measured value $x_s$ other than the above-mentioned measured values, is defined as the reference line width (the ideal line width or the target line width) (S50). This value can be incorporated from a test chart or other sources. In this case, $x_s$=6.00 and $y_s$=115.12 are selected as reference values.

Next, a correction coefficient $k_s$ is found in accordance with the following equation (31) (S52):

$$k_s = Cw_s y_s \quad (31)$$

Thus, $k_s$=5.90 is obtained.

Then, the values of Lw in the respective cell sizes are converted into Cwps by using the following conversion equation (32) (S51):

$$Cwps = Lw - Ax - k_s \quad (32)$$

The results thus obtained are shown in Table 15 and a graph in FIG. 29.

TABLE 15

| Target of Data Conversion | |
|---|---|
| Cell Size $x_s$ | Target Value $y_s$ |
| 6.00 | 115.12 |
| Data after Conversion | |
| Cell Size x | Corrected Value Cwps |
| 6.00 | 115.26 |
| 10.45 | 115.06 |
| 16.50 | 114.89 |
| 21.30 | 115.36 |

As described earlier, A represents a gradient of the above-mentioned regression line that was found from various values of x and Lw. Therefore, the conversion is carried out in an equivalent manner, and as is indicated by Table 15, Cwps represents the standardized line width irrespective of the cell size x. Thus, by using the standardized line width, it becomes possible to compare line widths in an equivalent manner, even if they were obtained by measurements using different magnifications.

In the present embodiment, the values ($x_s=6.00$, $y_s=115.12$), which were externally obtained without conducting actual measurements, are used as targets so as to standardize the measured values. For this reason, this method is particularly effective in such a case when the standardization of image-quality data is carried out by using values from a test chart or other sources.

Moreover, this method allows equivalent comparisons with even values obtained from a test chart.

As described above, the first image-quality measuring method of the present invention, which is an image-quality measuring method for measuring image-quality data used for evaluating image quality of an original document, is characterized by the steps of: preparing a window having cells that serve as pixels whose size is defined by a cell size; photographing the original document and displaying the resulting image on the cells; obtaining measured values consisting of the cell size x and the image-quality data y by finding the image-quality data; finding a regression line based upon the correlation between the cell size x and the image-quality data y, setting image-quality data related to a specific cell size as a reference value; and correcting the image-quality data by using a conversion equation based upon the regression line.

In the above-mentioned method, the image is displayed within the window with a specific magnification by determining the cell size. A regression line is found based on image-quality data that have been obtained under various cell sizes. The pieces of image data are converted in accordance with the regression line using the standard image-quality data related to a specific cell size, that is, a specific magnification, as a target. Therefore, the respective pieces of image-quality data are converted in an equivalent manner, and corrected to standardized values. As a result, dispersions in measured values, caused by varied magnifications within one measuring system, can be properly corrected. Since pieces of image-quality data, obtained under various magnifications, are compared with each other by using the standardized image-quality data, it becomes possible to compare pieces of image-quality data each other in an equivalent manner even if they were obtained by measurements using different magnifications.

Moreover, in general, the image-quality data vary depending on the measuring magnification as described earlier; and how they vary is affected by the image quality of the document, and it tends to differ. However, with the method of the present invention, the image-quality data is corrected based on the regression equation of measured values taken under a plurality of magnifications. For this reason, the gradient of the regression equation represents the image-quality data per unit length, that is, per cell size, and corresponds to the spacial frequency of the image. Therefore, after having been subjected to the correction, the image-quality data is less affected by the image quality of the original document. Thus, it becomes possible to improve the measurement precision with respect to images with a wide variety of image qualities.

Furthermore, in general, the higher the magnification, the higher the measurement precision, and high precision is not available without using a measuring device with a high magnification. However, the above-mentioned method makes it possible to correct measured values at a low magnification to measured values at a high magnification in an equivalent manner by using the measured values at the high magnification as standard values. Thus, it is possible to improve the measurement precision even in the case of measurements using a low magnification.

In the second image-quality measuring method of the present invention, an equation, $f(x)=A \cdot Ln(x)+Cr1$, is selected as a regression line in accordance with the first method, the image-quality data Cr1 in the case of x=1 is selected as the reference value, and the cell size x and the image-quality data y are substituted to a conversion equation $Cr1'=y-A \cdot Ln(x)$ so that the resulting image-quality data Cr1' after the correction is obtained.

With the above-mentioned method, a linear regression equation regarding the correlation between the logarithm of cell size x and the image-quality data is found. Thus, in addition to the effects of the first method, this method makes it possible to correct the image-quality data more precisely than the method wherein a linear regression equation is found based upon the correlation between the cell size itself and the image-quality data.

In the third image-quality measuring method of the present invention, the equation, $f(x)=A \cdot Ln(x)+Cr1$, is selected as a regression line in accordance with the first method, the image-quality data $y_i$, which is obtained when the cell size x shows a specific measured value $x_i$ within the measured values, is selected as the reference value, the correction coefficient $k_i$ is found from $k_i=Cr1-y_i$, and the cell size x and the image-quality data y are substituted to a conversion equation $Crpi=y-A \cdot Ln(x)-k_i$ so that the resulting image-quality data Crpi after the correction is obtained.

In the above-mentioned method, one of the pieces of image-quality data that have been obtained as measurement results within a single measuring system is selected as a reference so as to meet a purpose of evaluation. Then, dispersions in measured values of image-quality data caused by varied measuring magnifications within the measuring system are corrected. Therefore, the image-quality data, obtained as measurement results within a single measuring system, can be collected in an equivalent manner to the measuring magnification that meets the purpose of the evaluation. Therefore, equivalent comparisons with image-quality data at a specific magnification can be readily carried out, and the image-quality data can be evaluated with high precision.

Moreover, in general, in a measuring system, the measuring range at a given magnification is predetermined due to the limitation of the size of the window. For excess of the measuring range, another magnification is required for the measurements. However, as described earlier, in a conventional device, the measured values can not be compared in an equivalent manner because of the different magnifications. In contrast, the present method sets the measuring reference of image-quality data at a specific magnification, and the measured values are corrected by using the value obtained from its regression line as a target. Therefore, even in an actual case when another magnification is used due to the fact that the measuring range at a certain magnification is exceeded, the measured values of image-quality data can be compared in an equivalent manner.

In particular, even in the case when different magnifications are used due to the application of different measuring devices, the measured values of image-quality data can be compared in an equivalent manner by setting either of the magnifications as a reference. Therefore, the value of image-quality data, which has been obtained by measurements under a specific, desired magnification, can be set as the standard for measuring performances of the measuring devices.

In the fourth image-quality measuring method of the present invention, the equation, $f(x)=A \cdot Ln(x)+Cr1$, is selected as a regression line in accordance with the first method, image-quality data $y_s$ other than the measured values, which is obtained when the cell size x shows a specific measured value $x_s$ is selected as the reference value, the correction coefficient k1 is found from $k1=Cr1-y_s+A\cdot Ln(x)$, and the cell size x and the image-quality data y are substituted to a conversion equation $Crp1=y-A\cdot Ln(x)-k1$ so that the resulting image-quality data Crp1 after the correction is obtained.

With the above-mentioned method, image-quality data, obtained as measurement results within a single measuring system, can be collected in an equivalent manner to the measuring magnification that meets a purpose of the evaluation, based upon another image-quality data that has been obtained from another measuring system. Therefore, in addition to the effects of the first method, dispersions in measured values of image-quality data caused by varied measuring magnifications within the measuring system are corrected based upon values obtained from other sources, such as a test chart; consequently, it becomes possible to effectively adjust the corresponding measuring system.

In the fifth image-quality measuring method of the present invention, the equation, $f(x)=A\cdot Ln(x)+Cr1$, is selected as a regression line in accordance with the first method, image-quality data $y_s$ other than the measured values, which is obtained when the cell size x shows a specific measured value $x_s$ is selected as the reference value, the correction coefficient $k_s$ is found from $k_s=Cr1-y_s$, and the cell size x and the image-quality data y are substituted to a conversion equation $Crps=y-A\cdot Ln(x)-k_s$ so that the resulting image-quality data Crps after the correction is obtained.

With the above-mentioned method, image-quality data, obtained as measurement results within a single measuring system, can be collected in an equivalent manner to the measuring magnification that meets a purpose of the evaluation, based upon another image-quality data that has been obtained from another measuring system. Therefore, in addition to the effects of the first method, dispersions in measured values of image-quality data caused by varied measuring magnifications within the measuring system are corrected based upon values obtained from other sources, such as a test chart; consequently, it becomes possible to effectively adjust the corresponding measuring system.

Furthermore, equivalent comparisons can be made with measured values that have been preliminarily prepared from other sources such as a test chart. Therefore, it becomes possible to adjust a wide range of measuring systems effectively.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image-quality measuring method, which measures image-quality data used for evaluating image quality of an original document, comprising the steps of:
    preparing a window having cells that serve as pixels whose size is defined by a cell size;
    photographing the original document and displaying the resulting image on the cells;
    obtaining measured values of image-quality data y based on cell size x and the displayed image;
    finding a regression line based upon the correlation between the cell size x and the image-quality data y;
    setting image-quality data related to a specific cell size as a reference value; and
    correcting the image-quality data by using a conversion equation based upon the regression line.

2. The image-quality measuring method as defined in claim 1, further comprising the steps of:
    selecting an equation, $f(x)=A\cdot Ln(x)+Cr1$, as the regression line;
    selecting image-quality data Cr1 in the case of x=1 as the reference value; and
    substituting the cell size x and the image-quality data y to a conversion equation $Cr1'=y-A\cdot Ln(x)$ so that the resulting image-quality data Cr1' after the correction is obtained.

3. The image-quality measuring method as defined in claim 1, further comprising the steps of:
    selecting an equation, $f(x)=A\cdot Ln(x)+Cr1$, as the regression line;
    selecting image-quality data $y_i$ which is obtained when the cell size x shows a specific measured value $x_i$ within the measured values as the reference value;
    finding a correction coefficient $k_i$ from $k_i=Cr1-y_i$; and
    substituting the cell size x and the image-quality data y to a conversion equation $Crpi=y-A\cdot Ln(x)-k_i$ so that the resulting image-quality data Crpi after the correction is obtained.

4. The image-quality measuring method as defined in claim 1, further comprising the steps of:
    selecting an equation, $f(x)=A\cdot Ln(x)+Cr1$, as the regression line;
    selecting image-quality data $y_s$ that is other than the measured values and that is obtained when the cell size x shows a specific measured value $x_s$ as the reference value;
    finding the correction coefficient k1 from $k1=Cr1-y_s+A\cdot Ln(x)$; and
    substituting the cell size x and the image-quality data y to a conversion equation $Crp1=y-A\cdot n(x)-k_i$ so that the resulting image-quality data Crp1 after the correction is obtained.

5. The image-quality measuring method as defined in claim 1, further comprising the steps of:
    selecting an equation, $f(x)=A\cdot Ln(x)+Cr1$, as the regression line;
    selecting image-quality data $y_s$ that is other than the measured values and that is obtained when the cell size x shows a specific measured value $x_s$ as the reference value;
    finding a correction coefficient $k_s$ from $k_s=Cr1-y_s$; and
    substituting the cell size x and the image-quality data y to a conversion equation $Crps=y-A\cdot Ln(x)-k_s$ so that the resulting image-quality data Crps after the correction is obtained.

6. The image-quality measuring method as defined in claim 1, further comprising the steps of:
    selecting an equation, $f(x)=Ax+Cw_0$, as the regression line;
    selecting image-quality data $Cw_0$ in the case of x=0 as the reference value; and
    substituting the cell size x and the image-quality data y to a conversion equation $Cw_0'=y-Ax$ so that the resulting image-quality data $Cw_0'$ after the correction is obtained.

7. The image-quality measuring method as defined in claim 1, further comprising the steps of:
    selecting an equation, $f(x)=Ax+Cw_0$, as the regression line;

selecting image-quality data $y_i$ which is obtained when the cell size x shows a specific measured value $x_i$ within the measured values as the reference value;

finding a correction coefficient $k_i$ from $k_i = y_i - Cw_0$; and substituting the cell size x and the image-quality data y to a conversion equation $Cwpi = y - Ax - k_i$ so that the resulting image-quality data Cwpi after the correction is obtained.

8. The image-quality measuring method as defined in claim 1, further comprising the steps of:

selecting an equation, $f(x) = Ax + Cw_0$, as the regression line;

selecting image-quality data $y_s$ that is other than the measured values and that is obtained when the cell size x shows a specific measured value $x_s$ as the reference value;

finding the correction coefficient k1 from $k1 = Cw_0 - y_s + Ax_s$; and substituting the cell size x and the image-quality data y to a conversion equation $Cwp_0 = y - Ax - k1$ so that the resulting image-quality data $Cwp_0$ after the correction is obtained.

9. The image-quality measuring method as defined in claim 1, further comprising the steps of:

selecting an equation, $f(x) = Ax + Cw_0$, as the regression line;

selecting image-quality data $y_s$ that is other than the measured values and that is obtained when the cell size x shows a specific measured value $x_s$ as the reference value;

finding a correction coefficient $k_s$ from $k_s = Cw_0 - y_s$;

substituting the cell size x and the image-quality data y to a conversion equation $Cwps = y - Ax - k_s$ so that the resulting image-quality data Cwps after the correction is obtained.

10. The image-quality measuring method as defined in claim 1, wherein the regression line is found by using a minimum square method.

11. The image-quality measuring method as defined in claim 1, wherein the image-quality data is data that represents the degree of edge-irregularity of a line image.

12. The image-quality measuring method as defined in claim 1, wherein the image-quality data is data that represents the degree of edge-blurredness of a line image.

13. The image-quality measuring method as defined in claim 1, wherein the image-quality data is data that represents line width of a line image.

* * * * *